United States Patent
Ren

(10) Patent No.: US 9,244,641 B2
(45) Date of Patent: Jan. 26, 2016

(54) COMMUNICATION APPARATUS

(71) Applicant: Brother Kogyo Kabushiki Kaisha, Nagoya-shi, Aichi-ken (JP)

(72) Inventor: Yongyong Ren, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/484,501

(22) Filed: Sep. 12, 2014

(65) Prior Publication Data

US 2015/0077798 A1    Mar. 19, 2015

(30) Foreign Application Priority Data

Sep. 13, 2013 (JP) .................................. 2013-190890

(51) Int. Cl.

| | |
|---|---|
| G06F 15/00 | (2006.01) |
| G06F 3/12 | (2006.01) |
| H04W 76/02 | (2009.01) |
| H04W 84/20 | (2009.01) |
| H04W 12/06 | (2009.01) |

(52) U.S. Cl.
CPC ............ *G06F 3/1236* (2013.01); *G06F 3/1204* (2013.01); *G06F 3/1292* (2013.01); *H04W 76/023* (2013.01); *H04W 12/06* (2013.01); *H04W 84/20* (2013.01)

(58) Field of Classification Search
CPC .............................. H04W 84/20; H04W 12/06
USPC .......................................................... 358/1.15
See application file for complete search history.

(56) References Cited

U.S. PATENT DOCUMENTS

2010/0115097 A1*  5/2010  Gnanasambandam et al. ..................... G06F 9/5027
709/226

FOREIGN PATENT DOCUMENTS

JP    2006-254077 A    9/2006

OTHER PUBLICATIONS

"Wi-Fi Peer-to-Peer (P2P) Technical Specification, Version 1.1", Wi-Fi Alliance Technical Committee P2P Task Group, 2010, 159 pages.

* cited by examiner

*Primary Examiner* — Saeid Ebrahimi Dehkordy
(74) *Attorney, Agent, or Firm* — Banner & Witcoff, Ltd.

(57) ABSTRACT

A communication apparatus is provided. In a state where the communication apparatus belongs to a second wireless network as a master station, when a device is found which belonged to a first wireless network as a master station, to which the communication apparatus belonged as a slave station, the communication apparatus is disconnected from the second wireless network, and configures a state where the communication apparatus belongs to a third wireless network as a slave station and the first device belongs to the third wireless network as a master station.

7 Claims, 11 Drawing Sheets

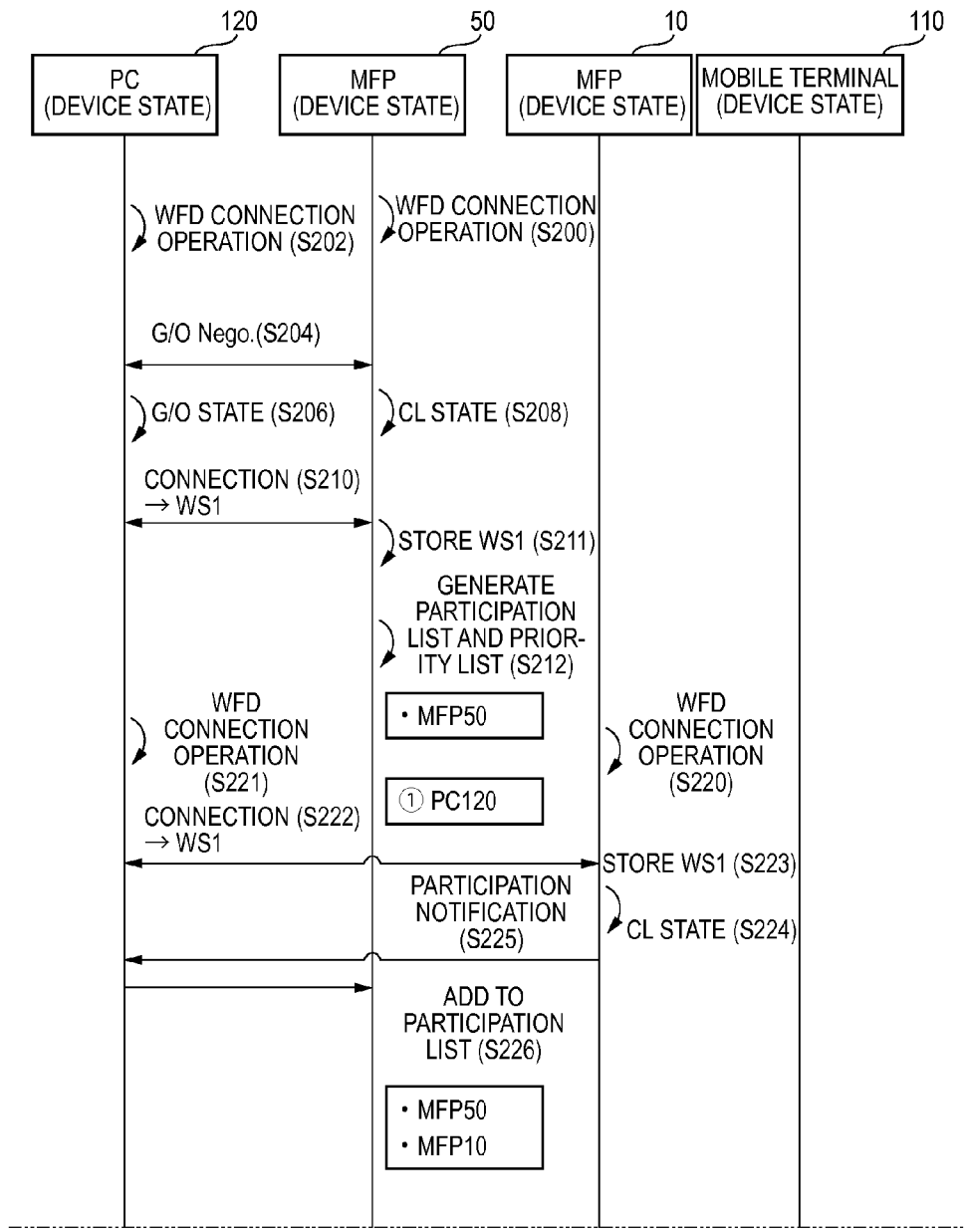

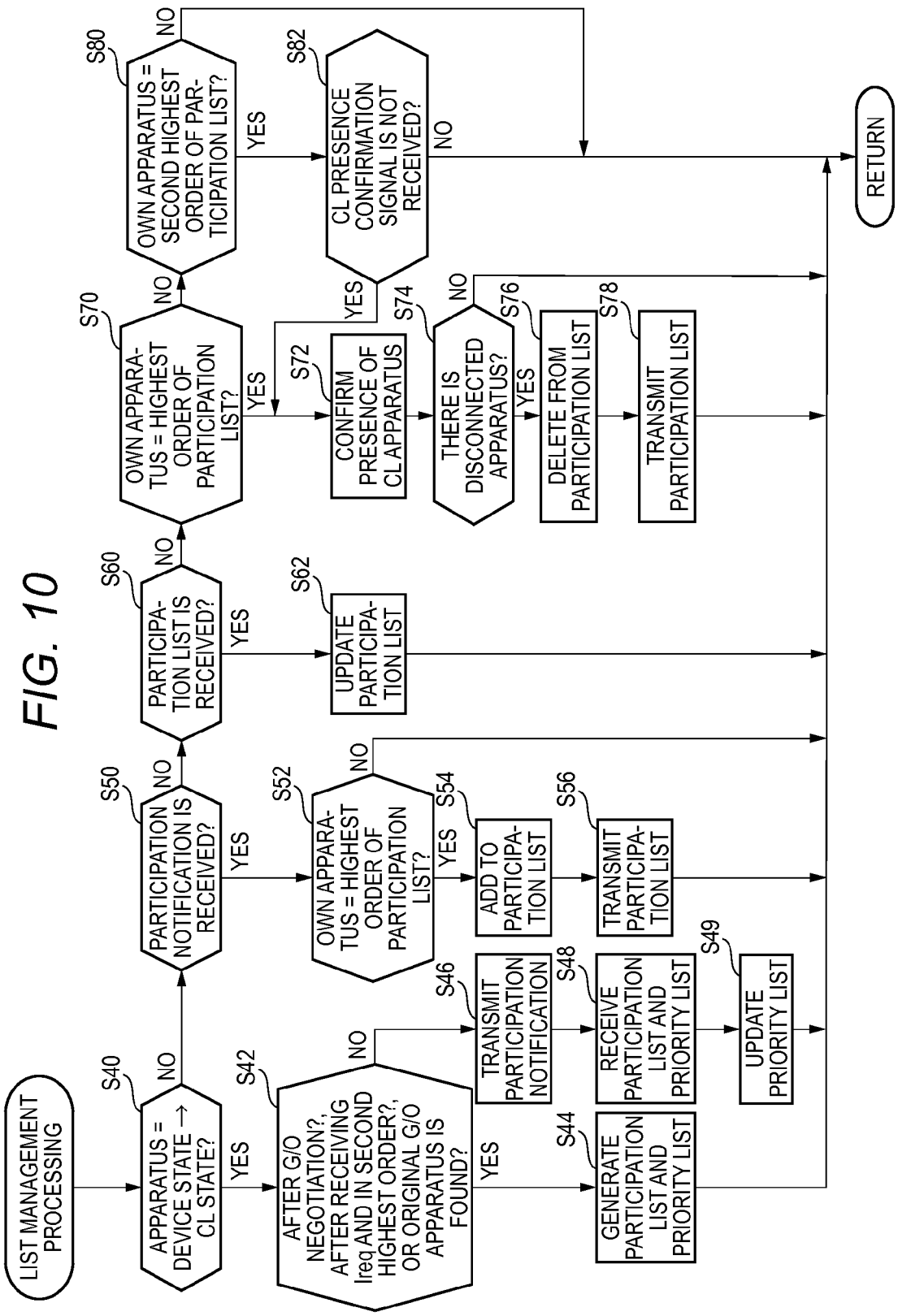

COMMUNICATION APPARATUS

CROSS-REFERENCE TO RELATED APPLICATION

This application claims priority from Japanese Patent Application No. 2013-190890, filed on Sep. 13, 2013, the entire subject matter of which is incorporated herein by reference.

TECHNICAL FIELD

This specification discloses a communication apparatus configured to belong to a wireless network.

BACKGROUND

JP-A-2006-254077 discloses a technique for connecting a wireless network connection apparatus to a wireless network. If network setting information is received from a network setting apparatus, the wireless network connection apparatus executes an operation to connect to a target wireless network based on the network setting information.

SUMMARY

This specification provides a technique capable of reducing a situation where a communication apparatus belongs to a wireless network as a master station.

According to an illustrative embodiment of the present invention, there is provided a communication apparatus comprising a controller configured to in a first belonging state where a first device belongs to a first wireless network as a master station and the communication apparatus belongs to the first wireless network as a slave station, store first communication information for executing wireless communication with the first device, in a memory; in the first belonging state where one or more devices including a second device belongs to the first wireless network as a slave station, store identification information of the second device, in the memory; confirm whether wireless communication with the first device can be executed using the first wireless network; when it is confirmed that wireless communication with the first device cannot be executed using the first wireless network, configure a second belonging state where the communication apparatus and the second device belong to a second wireless network, and where the communication apparatus belongs to the second wireless network as a master station and the second device belongs to the second wireless network as a slave station; search for the first device using the first communication information stored in the memory; when the first device is found by the search, cause the communication apparatus to be disconnected from the second wireless network; and when the communication apparatus is disconnected from the second wireless network, configure a third belonging state where the communication apparatus and the first device belong to a third wireless network, and where the communication apparatus belongs to the third wireless network as a slave station and the first device belongs to the third wireless network as a master station.

According to the above configuration, if the first device is found in a state where the communication apparatus belongs to a wireless network as a master station, the communication apparatus configure a state where the first device belongs to a wireless network as a master station and the communication apparatus belongs to the wireless network as a slave station. Therefore, when the communication apparatus and the first device are transited from a situation where wireless communication cannot be executed to a situation where wireless communication can be executed, a wireless network in which the first device belonging to an original wireless network as a master station serves as a master station can be newly formed. As a result, even though the communication apparatus belongs to the wireless network as a master station, when the communication apparatus and the first device are to belong to the same wireless network, a state where the first device belongs as a master station and the communication apparatus belongs as a slave station can be configured. Accordingly, it is possible to reduce a situation where the communication apparatus belongs to a wireless network as a master station.

A control method for realizing the above-described communication apparatus, a computer program, and a non-transitory computer-readable recording medium having the computer program recorded therein are new and useful. A system including the communication apparatus, the first device and the second device described above is new and useful.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 10 is a flowchart of list management processing.

DETAILED DESCRIPTION (Configuration of Communication System 2)

Figure 1:
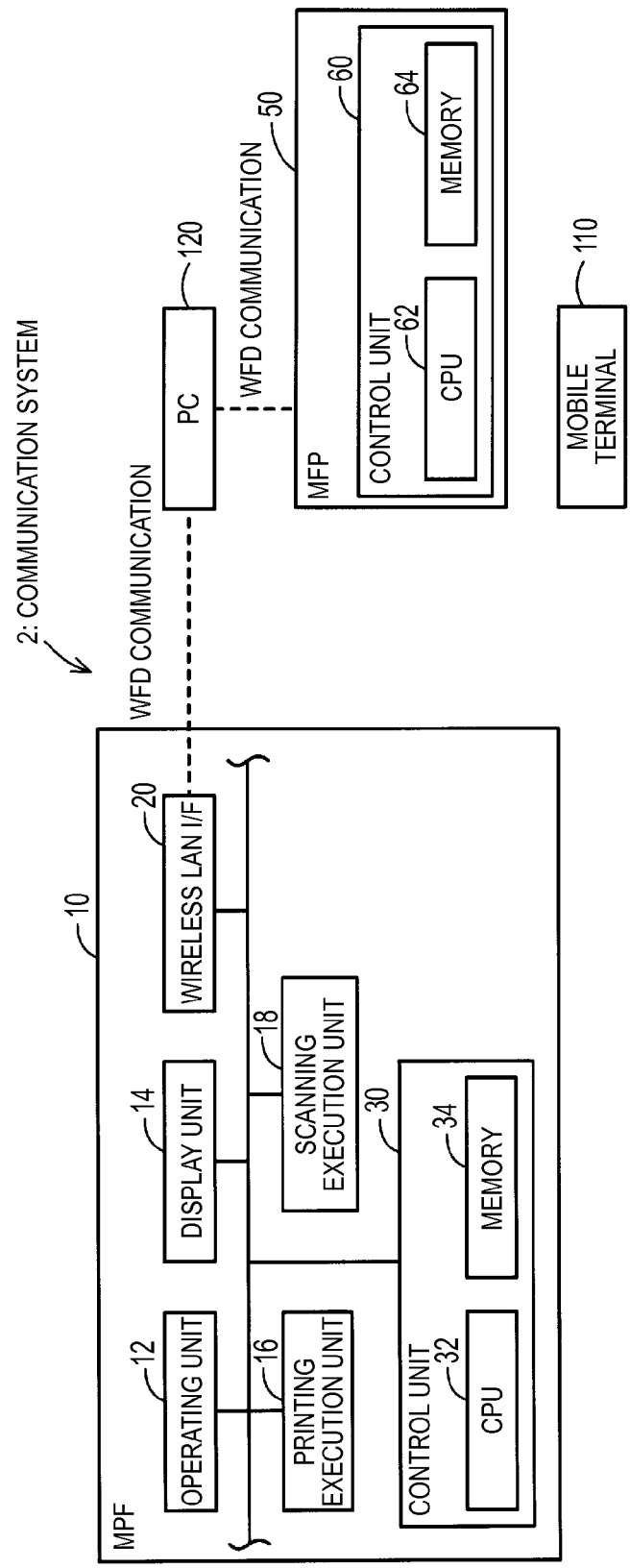
FIG. 1 shows the configuration of a communication system.

As shown in FIG. 1, a communication system 2 includes a plurality of Multi-Function Peripherals (MFPs) 10 and 50, a mobile terminal 110, and a personal computer (PC) 120.

(Type of Wireless Communication Executable by Each Apparatus 10, 50, 110, 120)

Respective apparatuses 10, 50, 110 and 120 can execute wireless communication (hereinafter, referred to as "WFD communication") according to a Wi-Fi Direct (Registered Trademark) system, i.e. WDF system.

(WFD Communication)

The WFD system is a wireless communication system which is described in the written standard "Wi-Fi Peer-to-Peer (P2P) Technical Specification Version 1.1" prepared by Wi-Fi Alliance. The WFD system is, for example, a wireless communication system which is configured to execute wireless communication according to the 802.11 standard of IEEE (The Institute of Electrical and Electronics Engineers, Inc.) and an equivalent standard (for example, 802.11a, 11b, 11g, 11n, or the like).

The respective apparatus 10, 50, 110 and 120 belong to a WFD network (hereinafter, referred to as "WFDNW"), thereby executing WFD communication of target data with other apparatuses belonging to the WFDNW. Target data is data including information of a network layer or higher layer (for example, an application layer) of an OSI reference model, and includes, for example, print data, scan data, and the like.

Like the respective apparatuses 10, 50, 110 and 120, an apparatus which can execute WFD communication is referred to as a "WFD compatible apparatus". In the written standard of WFD, as the state of a WFD compatible apparatus, a group owner state (hereinafter, referred to as "G/O state"), a client state (hereinafter, referred to as "CL state"), and a device state are defined. A WFD compatible apparatus is selectively operable in one state among the three states.

In order to form a new wireless network, first and second WFD compatible apparatuses in a device state normally execute wireless communication, called a G/O negotiation. In the G/O negotiation, the first WFD compatible apparatus (for example, the MFP 10) transmits information representing the G/O priority of the first WFD compatible apparatus to the second WFD compatible apparatus (for example, the PC 120), and receives information representing the G/O priority of the second WFD compatible apparatus from the second WFD compatible apparatus. The G/O priority of the first WFD compatible apparatus is an index representing the degree to which the first WFD compatible apparatus should become a G/O state, and is determined in the first WFD compatible apparatus in advance. Similarly, the G/O priority of the second WFD compatible apparatus is an index representing the degree to which the second WFD compatible apparatus should become a G/O state.

The first WFD compatible apparatus compares the two G/O priorities, determines that an apparatus having higher priority becomes a G/O state, and determines that an apparatus having lower priority becomes a CL state. Similarly, the second WFD compatible apparatus compares the two priorities and determines a G/O state and a CL state.

For example, it is assumed that the first WFD compatible apparatus becomes a G/O state and the second WFD compatible apparatus becomes a CL state. In this case, the first WFD compatible apparatus first prepares WFD wireless setting information which should be used in the WFDNW. The WFD wireless setting information includes an authentication system, an encryption system, a password, a Service Set Identifier (SSID), a Basic Service Set Identifier (BSSID), and the like. The authentication system, the encryption system, and the password included in the WFD wireless setting information are information for authentication and encryption in the WFDNW. The SSID included in the WFD wireless setting information is a network identifier for identifying the WFDNW. The BSSID included in the WFD wireless setting information is the MAC address of a G/O apparatus (that is, the first WFD compatible apparatus). Hereinafter, the WFD wireless setting information is referred to as "WFDWSI (abbreviation of WFD Wireless Setting Information)".

A method in which the first WFD compatible apparatus (that is, G/O apparatus) prepares the WFDWSI is as follows. That is, the first WFD compatible apparatus specifies an authentication system and an encryption system determined in advance. The first WFD compatible apparatus specifies a password determined in advance or generates a new password, thereby preparing the password. The first WFD compatible apparatus specifies an SSID determined in advance or generates a new SSID, thereby preparing the SSID. The first WFD compatible apparatus specifies a MAC address allocated in advance to the first WFD compatible apparatus as the BSSID.

The first WFD compatible apparatus provides the prepared WFDWSI to the second WFD compatible apparatus. Accordingly, the first and second WFD compatible apparatuses execute authentication communication (that is, communication of Authentication Request signal, Association Request signal, and the like) according to the WFDWSI. The first WFD compatible apparatus (that is, G/O apparatus) executes the authentication of the second WFD compatible apparatus (that is, CL apparatus), and if the authentication is successful, a connection is established between the first and second WFD compatible apparatuses. The first WFD compatible apparatus describes the MAC address of the second WFD compatible apparatus in a management list of the first WFD compatible apparatus. The management list is a list in which the MAC address of a CL apparatus is described to allow a G/O apparatus to manage the CL apparatus.

Accordingly, the first WFD compatible apparatus newly belongs to the WFDNW as a G/O apparatus (that is, newly forms the WFDNW), and the second WFD compatible apparatus newly belongs to the WFDNW as a CL apparatus.

In a stage where the WFDNW is newly formed by the G/O negotiation, only one G/O apparatus and one CL apparatus belong to the WFDNW. However, the G/O apparatus can establish a connection with other apparatuses and can allow other apparatuses to newly participate in the WFDNW as CL apparatuses. In this case, two or more CL apparatuses belong to the WFDNW. That is, in the WFDNW, there can be one G/O apparatus and one or more CL apparatuses. The G/O apparatus manages one or more CL apparatuses. Specifically, the G/O apparatus describes the MAC addresses of one or more CL apparatuses in the management list in the memory of the G/O apparatus. If a CL apparatus is disconnected from the WFDNW, the G/O apparatus deletes the MAC address of the CL apparatus from the management list.

The G/O apparatus can execute wireless communication of target data with the CL apparatus without passing through other apparatuses. The G/O apparatus can relay wireless communication of target data between a pair of CL apparatuses. In other words, a pair of CL apparatuses can execute wireless communication of target data through the G/O apparatus.

As described above, in the WFDNW, wireless communication of target data can be executed between WFD compatible apparatus as a transmission source of target data and WFD compatible apparatus as a transmission destination of target data without passing through an Access Point (AP) provided separately from the WFD compatible apparatus. That is, WFD communication and the WFD system respectively refer to wireless communication without passing through an AP and a wireless communication system in which an AP is not used. The AP is a normal AP, which is referred to as a wireless access point, a wireless LAN router, or the like, and is different from the G/O apparatus of the WFD system or so-called SoftAP.

The G/O apparatus cannot execute wireless communication of target data with a device apparatus (that is, WFD compatible apparatus in a device state), but can execute wireless communication of connection data for establishing a connection with the device apparatus. That is, the G/O apparatus executes wireless communication of connection data with the device apparatus and establishes a connection with the device apparatus to allow the device apparatus to newly participate in the WFDNW. In other words, the device apparatus can execute wireless communication of connection data with the G/O apparatus and establish a connection with the G/O apparatus to newly participate in the WFDNW. In this case, the device apparatus is transited from the device state to the CL state (that is, participates in the WFDNW as a CL apparatus). Connection data is data of a lower layer (for example, a physical layer or a data link layer) than the network layer of the OSI reference model (that is, data without information of the network layer), and includes, for example, a Probe Request signal, a Probe Response signal, an Association Request signal, an Association Response signal, an Authentication Request signal, a 4-Way Handshake signal, an Invitation Request signal, an Invitation Response signal, and the like.

The G/O apparatus cannot execute wireless communication of target data with WFD incompatible apparatus, but can execute wireless communication of connection data with WFD incompatible apparatus. The WFD incompatible apparatus is an apparatus which cannot operate according to the WFD system (that is, an apparatus which cannot selectively operate in either one of the three states of the WFD system). The G/O apparatus executes wireless communication of connection data with the WFD incompatible apparatus and establishes a connection with the WFD incompatible apparatus to allow the WFD incompatible apparatus to newly participate in the WFDNW. In other words, the WFD incompatible apparatus executes wireless communication of connection data with the G/O apparatus and establishes a connection with the G/O apparatus to newly participate in the WFDNW. The WFD incompatible apparatus does not selectively operate in either one of the three states (that is, G/O state, CL state, and device state), and operates in the same state as the CL state while belonging to the WFDNW.

(Configuration of MFP 10)

Subsequently, the configuration of the MFP 10 will be described. The MFP 50 has the similar configuration to the MFP 10. The MFP 10 is peripheral apparatus which can execute multiple functions including a printing function and a scanning function. The MFP 10 includes an operating unit 12, a display unit 14, a printing execution unit 16, a scanning execution unit 18, a wireless LAN interface (hereinafter, an interface is referred to as "I/F") 20, and a control unit 30. The respective units 12 to 30 are connected to a bus line (reference numeral is omitted).

The operating unit 12 includes a plurality of keys. A user can operate the operating unit 12 to input various instructions to the MFP 10. The display unit 14 is a display which is configured to display various kinds of information. The printing execution unit 16 has an ink jet type or laser type printing mechanism. The scanning execution unit 18 has a scanning mechanism, such as CCD or CIS.

The wireless LAN I/F 20 is an interface which is configured to execute WFD communication. The wireless LAN I/F 20 is allocated with a MAC address (hereinafter, referred to as "WFD MAC address") for use in WFD communication.

The MFP 50 is also allocated with a WFD MAC address. The WFD MAC address of the MFP 10 and the WFD MAC address of the MFP 50 are different.

The control unit 30 includes a CPU 32 and a memory 34. The memory 34 is configured by a ROM, a RAM, a hard disk, or the like. The CPU 32 executes various kinds of processing according to a program stored in the memory 34. The MFP 50 includes a control unit 60 which is similar to the control unit 30. The control unit 60 includes a CPU 62 which is similar to the CPU 32, and a memory 64 which is similar to the memory 34.

The memory 34 also stores a WFD state value representing a current state (that is, either one of the G/O state, the CL state, and the device state) of the MFP 10 relating to WFD. When the MFP 10 belongs to the WFDNW (that is, when the WFD state value represents the G/O state or the CL state), the memory 34 also stores the WFDWSI which is currently used in the WFDNW.

(Configuration of Mobile Terminal 110)

The mobile terminal 110 is a portable terminal apparatus, such as a mobile phone (for example, a smartphone), a PDA, a notebook PC, a tablet PC, a mobile music playing apparatus, or a mobile moving image playing apparatus. Similarly to the MFPs 10 and 50, the mobile terminal 110 can execute WFD communication. A WFD MAC address allocated to the mobile terminal 110 is different from the WFD MAC addresses of the MFPs 10 and 50.

(Configuration of PC 120)

The PC 120 includes an Operating System (OS) program. The PC 120 can execute WFD communication according to the OS program. A MAC address allocated to the PC 120 is different from the WFD MAC addresses of the MFPs 10 and 50 and the mobile terminal 110.

Figure 2B:
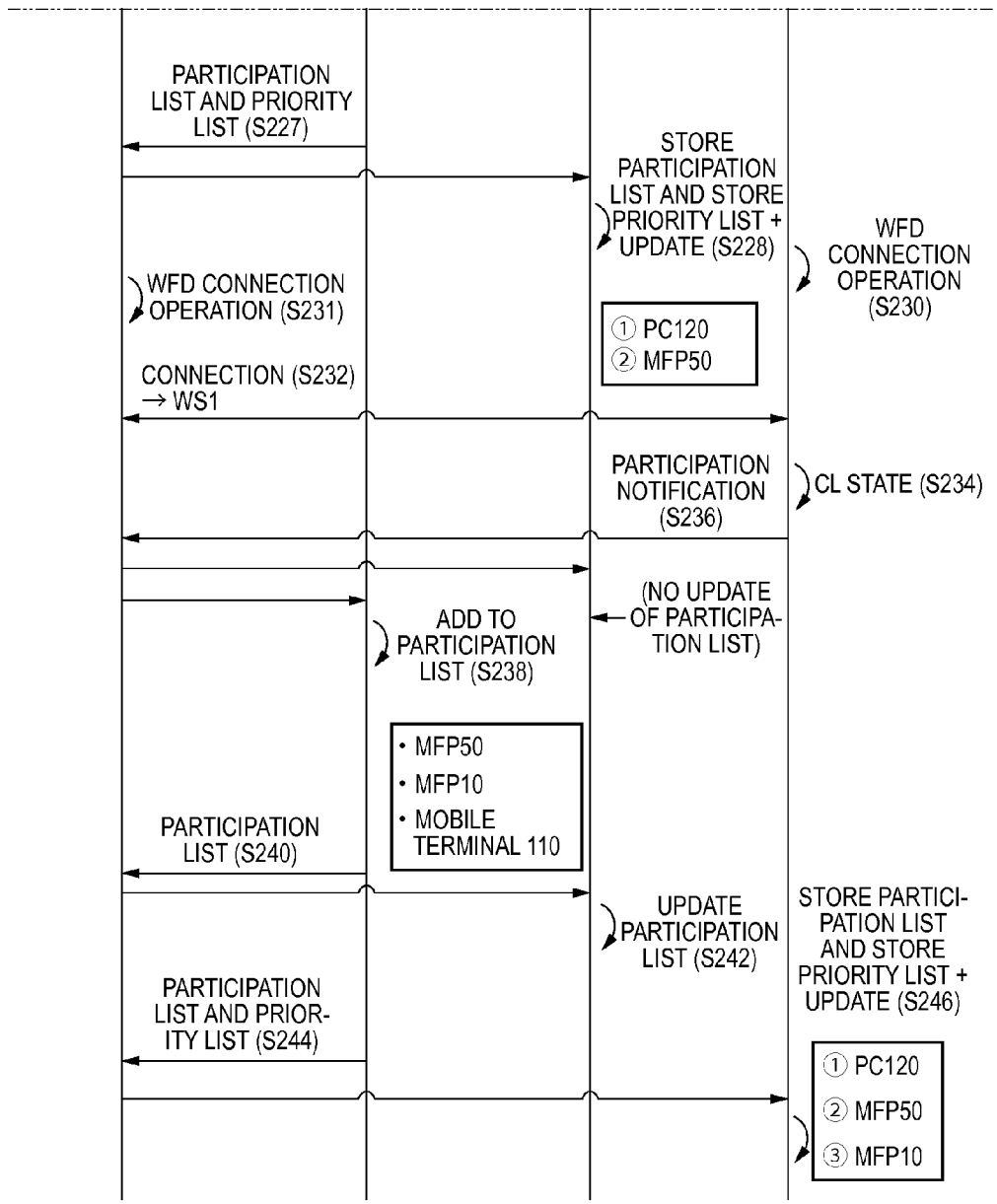
FIG. 2 (FIGS. 2A and 2B) is a sequence diagram of a case where a WFD network is formed.

(Case where WFDNW is Formed: FIG. 2)

Next, a case where the WFDNW is formed will be described referring to FIG. 2. In an initial state of FIG. 2, the WFDNW is not formed, and the respective apparatuses 10, 50, 110 and 120 are in the device state.

In S200, the user performs, to the operating unit of the MFP 50, a WFD connection operation to cause the MFP 50 to belong to the WFDNW. Specifically, the user selects an item representing "WFD system wireless connection" among a plurality of items on a screen displayed on the display unit of the MFP 50. In S202, the user performs, to the PC 120, a WFD connection operation (that is, an operation to select the item representing "WFD system wireless connection") for causing the PC 120 to belong to the WFDNW.

In S204, the CPU 62 of the MFP 50 executes a G/O negotiation with the PC 120. In S206, the PC 120 determines that the PC 120 becomes the G/O state as a result of the G/O negotiation. In S208, the CPU 62 determines that the MFP 50 becomes the CL state as a result of the G/O negotiation. That is, the CPU 62 changes the WFD state value in the memory 64 from a value representing the device state to a value representing the CL state.

In S210, the PC 120 prepares the WFDWSI (hereinafter, referred to as "WS1") which should be used in the WFDNW and provides WS1 to the MFP 50. Then, a connection is established between the PC 120 and the MFP 50. Accordingly, the PC 120 newly forms the WFDNW (hereinafter, referred to as "first WFDNW") as a G/O apparatus, and the MFP 50 participates in the first WFDNW as a CL apparatus. The CPU 62 stores WS1 in the memory 64. Accordingly, a state where the PC 120 belongs to the first WFDNW as a G/O apparatus and the MFP 50 belongs to the first WFDNW as a CL apparatus is configured.

Since the MFP 50 executes the G/O negotiation to be transited from the device state to the CL state, the MFP 50 is a CL apparatus which belongs to the first WFDNW earliest. Accordingly, in S212, the CPU 62 generates a participation list and a priority list. The participation list is a list in which the MAC address of each CL apparatus belonging to the first WFDNW is described. In the participation list, the MAC address of a CL apparatus which belongs to the WFDNW earlier (that is, a CL apparatus in which the WFD connection operation is executed earlier) is described in a higher order. For example, it is assumed that a WFDNW to which a G/O apparatus (for example, the PC 120), a first CL apparatus (for example, the MFP 10), and a second CL apparatus (for example, the mobile terminal 110) belong is formed. First, when the first CL apparatus belongs to the WFDNW, and then the second CL apparatus belongs to the WFDNW, the MAC address of the first CL apparatus is described in the highest order of the participation list, and the MAC address of the second CL apparatus is described in the second highest order of the participation list. The MAC address of the G/O apparatus is not described in the participation list. As described above, the G/O apparatus holds the management list in which the MAC address of each CL apparatus is described. The participation list is different from the management list in that the participation list is held by each CL apparatus.

Although described below in detail, the priority list is a list which represents the order of apparatuses, which should belong to the WFDNW as a G/O apparatus with priority. In the priority list, the MAC address of each apparatus and the order in which the apparatus should belong to the WFDNW as a G/O apparatus are described.

The CPU 62 generates a participation list in which the WFD MAC address of the MFP 50 is described in the highest order. The MFP 50 generates a priority list in which the PC 120 is described in the highest order. In FIGS. 2 to 8, the participation list and the priority list are expressed by rectangular boxes without reference numerals. In the participation list, the MAC addresses are described in an order of participating in the WFDNW. In the priority list, an order which represents priority of belonging as a G/O apparatus is expressed by an encircled number associated with the MAC address of each apparatus. "MFP 10", "MFP 50", "mobile terminal 110", and "PC 120" in each list mean that the MAC address of the MFP 10, the MAC address of the MFP 50, the MAC address of the mobile terminal 110, and the MAC address of the PC 120 are described in each list.

Next, in S220, the user performs, to the MFP 10, a WFD connection operation for causing the MFP 10 to belong to the first WFDNW. In this case, the CPU 32 of the MFP 10 transmits a connection request to the PC 120, which is a G/O apparatus. In S221, the user performs a WFD connection operation to the PC 120, which is a G/O apparatus. In S222, if the connection request is received from the MFP 10, the PC 120 provides WS1 currently being used in the first WFDNW to the MFP 10. In S223, the CPU 32 stores WS1 in the memory 34. As a result, a connection is established between the PC 120 and the MFP 10. In S224, the MFP 10 is transited from the device state to the CL state and newly participates in the first WFDNW as a CL apparatus. That is, the CPU 32 changes the WFD state value in the memory 34 from a value representing the device state to a value representing the CL state.

Next, in S225, the CPU 32 broadcasts a participation notification including the MAC address of the MFP 10. The participation notification is a notification indicating the MFP 10 newly participating in the WFDNW to other CL apparatuses of the WFDNW.

The CPU 62 of the MFP 50 receives the participation notification from the MFP 10 through the PC 120. Since the MFP 50 is the earliest CL apparatus (that is, a CL apparatus described in the highest order of the participation list), in S226, the CPU 62 adds the MAC address of the MFP 10 in the lowest order of the participation list. Even when the participation notification is received from the MFP 10, the CPU 62 does not change the priority list. Next, in S227, the CPU 62 designates the MAC address of the MFP 10 as a transmission destination and transmits the participation list and the priority list to the PC 120. In a modified example, the CPU 62 may broadcast the participation list and the priority list to the first WFDNW.

The CPU 32 of the MFP 10 receives the participation list and the priority list from the MFP 50 through the PC 120. Then, in S228, the CPU 32 stores the participation list and the priority list in the memory 34. In S228, the CPU 32 updates the priority list using the received participation list and priority list. Specifically, the CPU 32 confirms whether the MAC address of another apparatus is described in a higher order than the MAC address of the MFP 10 in the participation list in the memory 34. If it is confirmed that the MAC address of the MFP 50 is described in a higher order than the MAC address of the MFP 10, the CPU 32 describes the MAC address of the MFP 50 in the priority list in the memory 34. Accordingly, the priority list is updated. That is, in the priority list, the order of apparatuses which should belong to the WFDNW as a G/O apparatus with priority is given in an order of apparatuses belonging to the WFDNW earlier. In a modified illustrative embodiment, the order of the priority list may be determined by, for example, the type (PC, MFP, or mobile terminal) of apparatuses. In this case, in S226, the CPU 62 may update the priority list which is managed by the MFP 50.

Next, in S230, the user performs, to the mobile terminal 110, a WFD connection operation for causing the mobile terminal 110 to belong to the first WFDNW. The mobile terminal 110 transmits a connection request to the PC 120, which is a G/O apparatus. In S231, the user performs a WFD connection operation to the PC 120, which is a G/O apparatus. In S232, if the connection request is received from the mobile terminal 110, the PC 120 provides WS1 currently being used in the first WFDNW to the mobile terminal 110. As a result, a connection is established between the PC 120 and the mobile terminal 110. In S234, the mobile terminal 110 is transited to the CL state and newly participates in the first WFDNW as a CL apparatus. Accordingly, a state where the PC 120 belongs to the first WFDNW as a G/O apparatus, and the MFPs 50 and 10 and the mobile terminal 110 belong to the first WFDNW as a CL apparatus is configured. In S236, the mobile terminal 110 broadcasts a participation notification including the MAC address of the mobile terminal 110.

The CPU 32 of the MFP 10 receives the participation notification from the mobile terminal 110 through the PC 120. Since the MFP 10 is not the earliest CL apparatus, even if the participation notification is received, the CPU 32 does not update the participation list.

The CPU 62 of the MFP 50 receives the participation notification from the mobile terminal 110 through the PC 120. In S238, since the MFP 50 is the earliest CL apparatus, the CPU 62 describes the MAC address of the mobile terminal 110 in the lowest order of the participation list and generates an updated participation list. Next, in S240, the CPU 62 transmits the updated participation list to a MAC address (that is, the MAC address of the MFP 10) other than the MAC address of the MFP 50 among the MAC addresses (that is, the MAC addresses of the MFPs 50 and 10) described in a higher order than the MAC address of the mobile terminal 110 in the updated participation list. In S242, if the participation list is received from the MFP 50 through the PC 120, the CPU 32 of the MFP 10 updates the participation list in the memory 34.

In S244, the CPU 62 of the MFP 50 designates the MAC address (that is, the MAC address of the mobile terminal 110) described in the lowest order of the updated participation list as a transmission destination and transmits the participation list and the priority list to the PC 120. In S246, if the participation list and the priority list are received from the MFP 50 through the PC 120, the mobile terminal 110 stores the participation list and the priority list in the memory of the mobile terminal 110. In S246, the mobile terminal 110 updates the priority list using the participation list and the priority list stored in the memory of the mobile terminal 110. A priority list updating method is similar to that in S228. In a modified example, the CPU 62 may broadcast the participation list and the priority list to the first WFDNW. In this case, when the received participation list is different from the participation list in the memory 34, the CPU 32 of the MFP 10 may update the participation list in the memory 34 and may discard the received priority list. When the received participation list is the same as the participation list in the memory 34, the CPU 32 may discard the received participation list and priority list.

As described above, once processing of FIG. 2 is executed, the first WFDNW in which the PC 120 is a G/O apparatus and the MFPs 10 and 50 and the mobile terminal 110 are CL apparatuses is formed. Therefore, for example, the mobile terminal 110 can transmit print data to the MFP 10 through the PC 120 (that is, a G/O apparatus) using the first WFDNW to cause the MFP 10 to execute printing. In this case, the CPU 32 of the MFP 10 receives print data from the mobile terminal 110 through the PC 120 (that is, a G/O apparatus) using the first WFDNW. Then, the CPU 32 provides print data to the printing execution unit 16 to cause the printing execution unit 16 to execute printing.

Figure 3:
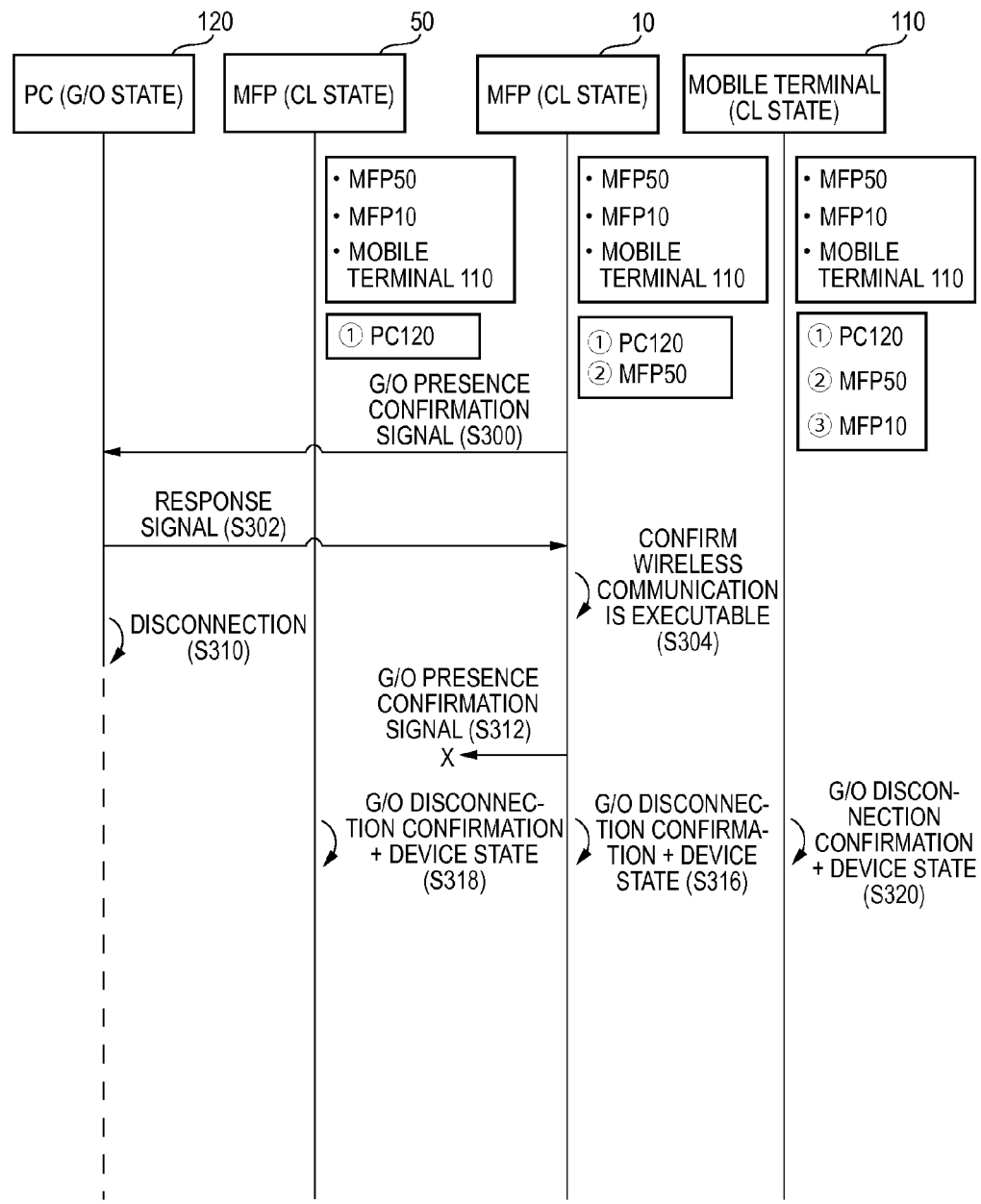
FIG. 3 is a sequence diagram of a case where a G/O apparatus is disconnected.
Figure 4:
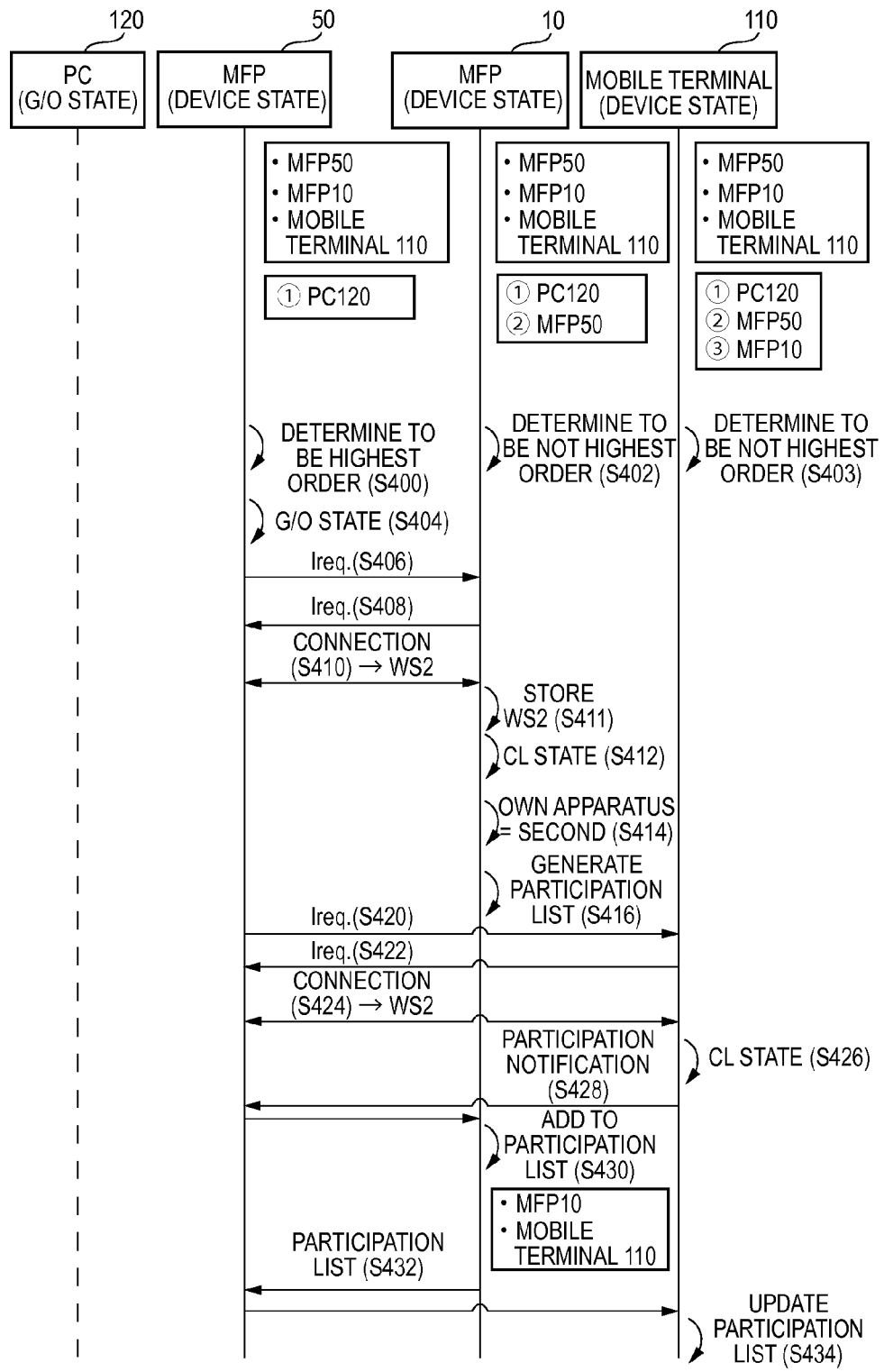
FIG. 4 is a sequence diagram of a case where a WFD network is newly formed.

(Case where G/O Apparatus is Disconnected from First WFDNW: FIGS. 3 and 4)

Subsequently, the contents of processing of the respective apparatuses 10, 50, 110 and 120 when disconnecting from the first WFDNW will be described referring to FIGS. 3 and 4. An initial state of FIG. 3 is the same state as a final state of FIG. 2, that is, a state where the first WFDNW, in which the PC 120 is a G/O apparatus and the MFPs 10 and 50 and the mobile terminal 110 are CL apparatuses, is formed.

Although not shown, in the MFP 50 having the MAC address described in the highest order of the participation list, the CPU 62 executes the presence confirmation of each CL apparatus different from the MFP 50. When there is a CL apparatus for which the presence confirmation cannot be executed, the CPU 62 deletes the MAC address of the CL apparatus from the participation list.

Each CL apparatus executes the presence confirmation of a G/O apparatus periodically while belonging to the WFDNW. In S300, the CPU 32 of the MFP 10 executes the presence confirmation of the PC 120. Specifically, the CPU 32 designates the BSSID (that is, the MAC address) of the PC 120 included in WS1 in the memory 34 as a transmission destination and transmits a G/O presence confirmation signal to the PC 120 using the first WFDNW. In S300, in a stage where the G/O presence confirmation signal is transmitted, the PC 120 is not disconnected from the first WFDNW. Accordingly, in S302, if the G/O presence confirmation signal is received from the MFP 10, the PC 120 transmits a response signal including the MAC address of the PC 120 to the MFP 10 using the first WFDNW.

In S304, if the response signal is received from the PC 120, the CPU 32 of the MFP 10 confirms that the PC 120 belongs to the first WFDNW, that is, the PC 120 can execute wireless communication. Although not shown in FIG. 3, similarly to the MFP 10, each of the MFP 50 and the mobile terminal 110 repeatedly executes the presence confirmation of the PC 120 using the first WFDNW.

For example, if the PC 120 is moved to a place where wireless communication with the MFP 50 or the like cannot be executed, in S310, the PC 120 is disconnected from the first WFDNW. Thereafter, in S312, the CPU 32 of the MFP 10 tries to transmit the G/O presence confirmation signal to the PC 120 using the first WFDNW. However, the PC 120 does not receive the G/O presence confirmation signal, and thus does not transmit the response signal.

Although not shown in FIG. 3, each of the MFP 50 and the mobile terminal 110 transmits the G/O presence confirmation signal to the PC 120 using the first WFDNW, but does not receive the response signal. In this case, in S316, since the response signal is not received from the PC 120, the CPU 32 of the MFP 10 confirms that the PC 120 does not belong to the first WFDNW (that is, the PC 120 is disconnected from the first WFDNW), that is, wireless communication with the PC 120 cannot be executed. Then, the CPU 32 causes the state of the MFP 10 to be transited from the CL state to the device state. That is, the CPU 32 changes the WFD state value in the memory 34 from a value representing the CL state to a value representing the device state. The WFDWSI, the participation list, and the priority list in the memory 34 are maintained in the memory 34 without being deleted from the memory 34.

Similarly, in S318, the CPU 62 of the MFP 50 confirms that the PC 120 is disconnected from the first WFDNW and causes the state of the MFP 50 to be transited from the CL state to the device state. In S320, the mobile terminal 110 confirms that the PC 120 is disconnected from the first WFDNW and causes the state of the mobile terminal 110 to be transited from the CL state to the device state. The respective apparatuses 10, 50, and 110 operate in the device state and thus cannot execute wireless communication of target data. For example, the mobile terminal 110 cannot transmit print data to the MFP 10 (or the MFP 50).

As described above, the CL apparatus, such as the MFP 10 or 50, transmits the G/O presence confirmation signal to the PC 120 (that is, the G/O apparatus) using the first WFDNW and determines whether the response signal is received from the PC 120, thereby appropriately confirming whether the PC 120 (that is, the G/O apparatus) is disconnected from the first WFDNW. Hereinafter, the processing of respective the CL apparatuses when the PC 120 (that is, the G/O apparatus) is disconnected from the first WFDNW will be described.

An initial state of FIG. 4 is a final state of FIG. 3, that is, a state where the PC 120 is disconnected from the first WFDNW, and the MFPs 10 and 50 and the mobile terminal 110 are in the device states. The PC 120 is maintained in the G/O state. In S400, the CPU 62 of the MFP 50 determines whether the MAC address of the MFP 50 is described in the highest order of the participation list in the memory 64. That is, the CPU 62 determines whether the MFP 50 is the earliest CL apparatus of the first WFDNW. In S400, the CPU 62 determines that the MFP 10 is the earliest CL apparatus.

In S402, the CPU 32 of the MFP 10 determines that the MFP 10 is not the earliest CL apparatus of the first WFDNW. In S403, the mobile terminal 110 determines that the mobile terminal 110 is not the earliest CL apparatus of the first WFDNW. In this case, the MFP 10 and the mobile terminal 110 wait until an Invitation Request signal (hereinafter, referred to as "Ireq signal") is received from the earliest CL apparatus (that is, the MFP 50) of the first WFDNW. The Ireq signal is a signal which is transmitted by the G/O apparatus. The Ireq signal is a signal which requests transmission destination apparatus (for example, the MFP 10) of the Ireq signal to belong to the existing WFDNW, to which the transmission source apparatus (that is, the G/O apparatus) of the Ireq signal belongs, as a CL apparatus.

In S404, the CPU 62 of the MFP 50 causes the state of the MFP 50 to be transited from the device state to the G/O state. As described above, in order to newly form the WFDNW, normally, a G/O negotiation is executed, and a G/O apparatus and client apparatus are determined. However, in S404, the CPU 62 causes the state of the MFP 50 to be transited from the CL state to the G/O state without executing a G/O negotiation. If S404 is executed, the MFP 50 becomes a G/O apparatus, but there is no client apparatus. In other words, it can be said that, if S404 is executed, a WFDNW (hereinafter, referred to as "second WFDNW") to which only a G/O apparatus (that is, the MFP 50) belongs is newly formed. According to this configuration, when wireless communication with the PC 120 using the first WFDNW cannot be executed, it is possible to appropriately determine whether to belong to a new WFDNW as a G/O apparatus.

Specifically, in S404, the CPU 62 changes the WFD state value in the memory 64 from a value representing the device state to a value representing the G/O state. The CPU 62 prepares WFDWSI (hereinafter, referred to as "WS2") which should be used in the second WFDNW, and stores WS2 in the memory 64.

The CPU 62 executes S404 and thus operates as a G/O apparatus. Therefore, in S406 and S420 described below, the CPU 62 can transmit an Ireq signal which can be transmitted only by a G/O apparatus, and as a result, can allow the MFP 10 and the mobile terminal 110 to participate in the second WFDNW.

In S406, the CPU 62 extracts the MAC address of the MFP 10 described in the second highest order of the participation list in the memory 64. Then, the CPU 62 designates the MAC address of the MFP 10 as a transmission destination and transmits an Ireq signal. The Ireq signal is a signal which, after highest-order apparatus described in the participation list becomes a G/O apparatus, is transmitted from the G/O apparatus to respective apparatuses after the highest order described in the participation list. At this time, the highest-order apparatus (that is, the G/O apparatus) initially transmits the Ireq signal to the second highest-order apparatus of the participation list, and then sequentially transmits the Ireq signal to the respective apparatuses after the second highest order. Accordingly, the MFP 50 can request the MFP 10 and the mobile terminal 110 to newly belong to the second WFDNW as a CL apparatus.

In S408, if the Ireq signal is received from the MFP 50, the CPU 32 of the MFP 10 transmits an Invitation Response signal (hereinafter, referred to as "Ires signal") to the MFP 50. If the Ires signal is received from the MFP 10, in S410, the CPU 62 of the MFP 50 provides WS2 to the MFP 10. As a result, a connection is established between the MFP 50 and the MFP 10. In S411, the CPU 32 stores WS2 in the memory 34. In S412, the CPU 32 causes the state of the MFP 10 to be transited from the device state to the CL state. Then, the MFP 10 newly participates in the second WFDNW as a CL apparatus. In other words, a state where the MFP 50 belongs to the second WFDNW as a G/O apparatus and the MFP 10 belongs to the second WFDNW as a CL apparatus is configured.

In S414, the CPU 32 determines that the MFP 10 is transited from the device state to the CL state, receives the Ireq signal in the second highest order of the participation list, and is transited to the CL state. In S416, the CPU 32 generates a new participation list in which the MAC address of the MFP 10 is described in the highest order, and stores the new participation list in the memory 34, instead of an old participation list in which the MAC address of the MFP 10 is described in the second highest order or lower order.

Next, similarly to the case of the MFP 10, the CPU 62 of the MFP 50 causes the mobile terminal 110 to participate in the second WFDNW. That is, in S420, the CPU 62 designates the MAC address of the mobile terminal 110 described in the third highest order (that is, the lowest order) of the participation list in the memory 64 of the MFP 50 as a transmission destination and transmits the Ireq signal. In S422, the CPU 62 receives the Ires signal from the mobile terminal 110. In S424, the CPU 62 provides WS2 to the mobile terminal 110. As a result, a connection is established between the MFP 50 and the mobile terminal 110.

In S426, the mobile terminal 110 causes the state of the mobile terminal 110 to be transited from the device state to the CL state. Accordingly, the mobile terminal 110 newly participates in the second WFDNW as a CL apparatus. In other words, a state where the MFP 50 belongs to the second WFDNW as a G/O apparatus and the MFP 10 and the mobile terminal 110 belong to the second WFDNW as a CL apparatus is configured.

In S428, the mobile terminal 110 is transited from the device state to the CL state, receives the Ireq signal in the third highest order of the participation list, and is transited to the CL state. The mobile terminal 110 broadcasts a participation notification including the MAC address of the mobile terminal 110 to the second WFDNW. The CPU 32 of the MFP 10 receives the participation notification from the mobile terminal 110 through the MFP 50 (that is, a G/O apparatus). In this case, in S430, since the MFP 10 is the earliest CL apparatus (that is, a CL apparatus described in the highest order of the participation list), the CPU 32 adds the MAC address of the mobile terminal 110 to the lowest order of the participation list and generates an updated participation list. Next, in S432, the CPU 32 transmits the updated participation list to the MFP 50 with the MAC address of the mobile terminal 110 as a transmission destination.

In S434, if the participation list is received from the MFP 10, the mobile terminal 110 stores the received participation list in the memory (not shown) of the mobile terminal 110, instead of an old participation list.

Figure 5:
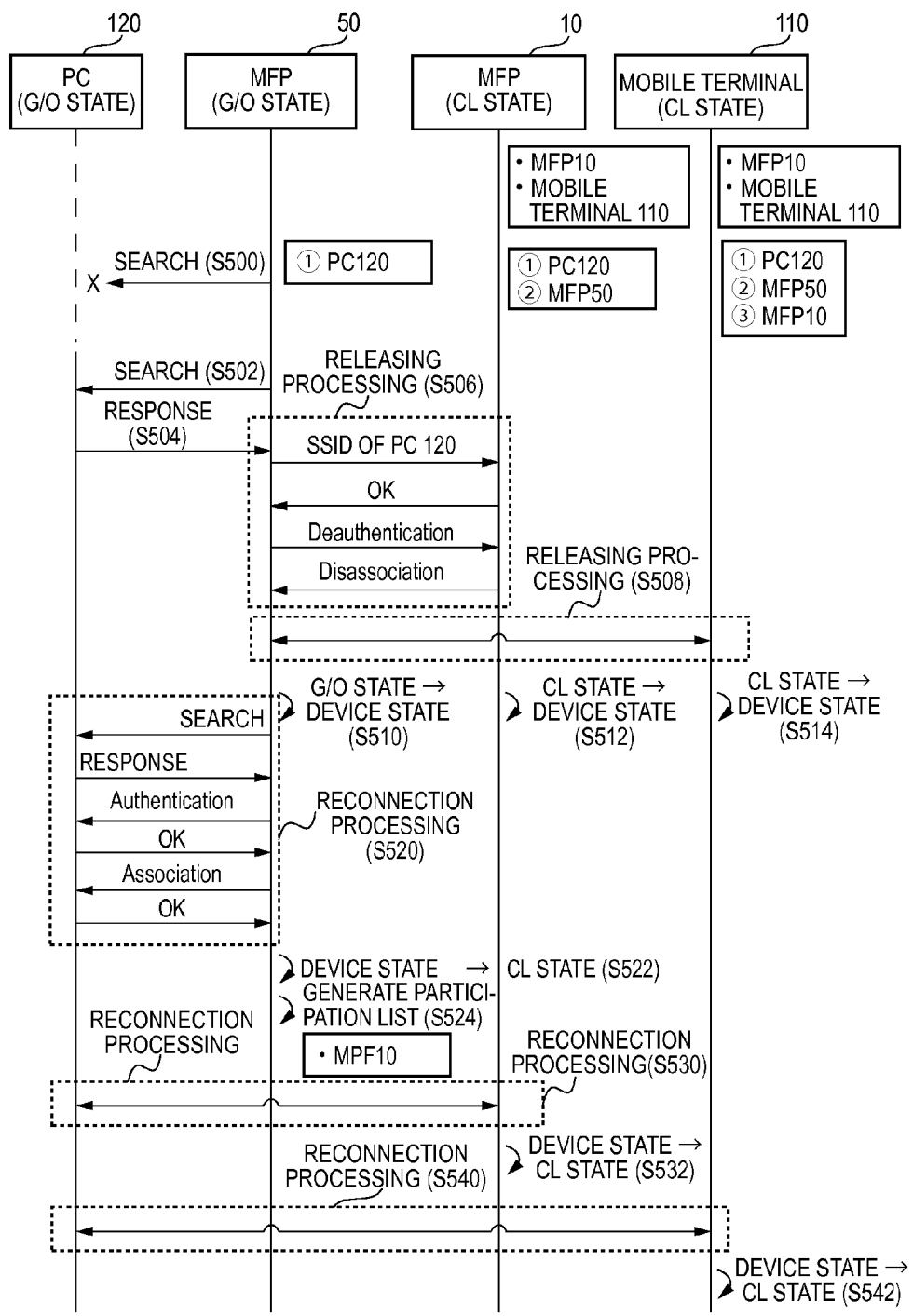
FIG. 5 is a sequence diagram of a case A where a PC is found.

(Case A where PC 120 Returns to Communicable State: FIG. 5)

An initial state of a case A of FIG. 5 is the same as a final state of FIG. 4. In this state, the CPU 62 of the MFP 50 which is the G/O apparatus of the second WFDNW searches for the PC 120 which is the G/O apparatus of the first WFDNW (S500). Specifically, the CPU 62 sends a Probe Request signal using the SSID and the BSSID (that is, the MAC address of the PC 120) of the PC 120 included in WS1 in the memory 64. The CPU 62 sends the Probe Request signal periodically to search for the PC 120. When a Probe Response signal is not received in response to the Probe Request signal within a predetermined period after the Probe Request signal is sent, the CPU 62 determines that the PC 120 cannot be found, that is, determines that the MFP 50 and the PC 120 are unable to execute wireless communication. Incidentally, the CPU 62 sends the Probe Request signal without using the WFDNW.

For example, there is a case where the PC 120 is moved and becomes close to the MFP 50, and thus the PC 120 and the MFP 50 are transited from a state where wireless communication is not possible to a state where wireless communication is possible. In a state where the PC 120 and the MFP 50 are able to execute wireless communication, the PC 120 receives the Probe Request signal sent from the MFP 50 (S502). In S504, the PC 120 transmits the Probe Response signal in response to the received Probe Request signal.

The CPU 62 receives the Probe Response signal from the PC 120 to find the PC 120. Then, the CPU 62 determines that the MFP 50 and the PC 120 are able to execute wireless communication. In this case, in S506, the CPU 62 executes releasing processing for releasing the second WFDNW with the MFP 10.

Specifically, the CPU 62 transmits an original G/O confirmation signal including the SSID and the MAC address of the PC 120 to the MFP 10 using the second WFDNW. The CPU 32 of the MFP 10 receives the original G/O confirmation signal from the MFP 50. The CPU 32 determines whether the WFDWSI including an SSID same as the SSID included in the original G/O confirmation signal and a BSSID same as the MAC address included in the original G/O confirmation signal is stored in the memory 34. The memory 34 stores WS1 and WS2. The CPU 32 determines that the WFDWSI (that is, WS1) including the SSID and BSSID same as the SSID and the MAC address included in the original G/O confirmation signal is stored in the memory 34. In this case, the CPU 32 transmits a signal indicating OK to the MFP 50 in response to the original G/O confirmation signal. According to this configuration, the MFP 10 can recognize that the PC 120 which is the original G/O apparatus is found by the MFP 50.

If the signal indicating OK is received, the CPU 62 of the MFP 50 transmits a Deauthentication signal to the MFP 10 using the second WFDNW. The Deauthentication signal is a signal which, when the G/O apparatus releases the WFDNW, that is, when the G/O apparatus is transited from the G/O state to a different state (for example, the device state), is transmitted from the G/O apparatus to the CL apparatus to cancel the connection with each CL apparatus belonging to the WFDNW. If the Deauthentication signal is received from the MFP 50, the CPU 32 of the MFP 10 transmits a Disassociation signal to the MFP 50 in response to the Deauthentication signal using the second WFDNW. The Disassociation signal is a signal which, when the CL apparatus disconnects the connection with the G/O apparatus, is transmitted from the CL apparatus to the G/O apparatus. In S508, as in S506, the CPU 62 executes the releasing processing with the mobile terminal 110. The CPU 62 may broadcast the original G/O confirmation signal to the second WFDNW. According to this configuration, the mobile terminal 110 can recognize that the PC 120 which is the original G/O apparatus is found by the MFP 50.

In S510, if the releasing processing with the CL apparatus (that is, the MFP 10 and the mobile terminal 110) of all MAC addresses described in the management list is executed, the CPU 62 causes the state of the MFP 50 to be transited from the G/O state to the device state. In S512, the CPU 32 of the MFP 10 causes the state of the MFP 10 to be transited from the CL state to the device state. In S514, the mobile terminal 110 causes the state of the mobile terminal 110 to be transited from the CL state to the device state.

Subsequently, in S520, the CPU 62 of the MFP 50 executes reconnection processing with the PC 120. Specifically, initially, the CPU 62 searches for the PC 120 to confirm whether wireless communication with the PC 120 can be executed. The PC 120 transmits a response to the search to the MFP 50. The search and the response in the reconnection processing are similar to the processing which is executed by the CPU 62 and the PC 120 in S502 and S504.

If the response is received from the PC 120, the CPU 62 executes communication for establishing a connection between the MFP 50 and the PC 120 with the PC 120 using WS1. This communication is similar to the authentication communication according to the normal WFDWSI. That is, the CPU 62 transmits an Authentication Request signal generated using WS1 to the PC 120. If the Authentication Request signal is received from the MFP 50, the PC 120 executes authentication processing using the Authentication Request signal. If the authentication processing is successful, the PC 120 transmits a signal indicating OK to the MFP 50 in response to the Authentication Request signal. Subsequently, if the signal indicating OK to the Authentication Request signal is received, the CPU 62 transmits an Association Request signal to the PC 120. If the Association Request signal is received from the MFP 50, the PC 120 transmits a signal indicating OK to the MFP 50. If the signal indicating OK to the Association Request signal is received by the CPU 62, a connection is established between the PC 120 and the MFP 50.

In S522, the CPU 62 causes the state of the MFP 50 to be transited from the device state to the CL state. As a result, the PC 120 newly forms a WFDNW (hereinafter, referred to as "third WFDNW") as a G/O apparatus, and the MFP 50 participates in the third WFDNW as a CL apparatus. Accordingly, a state where the PC 120 belongs to the third WFDNW as a G/O apparatus and the MFP 50 belongs to the third WFDNW as a CL apparatus is configured.

Since the MFP 50 finds the PC 120 which is the original G/O apparatus and is then transited from the device state to the CL state, the MFP 50 is the earliest CL apparatus. Accordingly, in S524, the CPU 62 generates a participation list. A priority list is already stored in the memory 64, and thus, the CPU 62 does not generate a priority list.

Next, in S530, the PC 120 and the MFP 10 execute similar reconnection processing as in S520. As a result, in S532, the CPU 32 of the MFP 10 causes the state of the MFP 10 to be transited from the device state to the CL state. Accordingly, a state where the PC 120 belongs to the third WFDNW as a G/O apparatus and the MFPs 10 and 50 belong to the third WFDNW as CL apparatuses is configured. In S540, the PC 120 and the mobile terminal 110 execute similar reconnection processing as in S520. Although not shown, as in S225 and S236 of FIG. 2, if each of the MFP 10 and the mobile terminal 110 is transited from the device state to the CL state and newly participates in the third WFDNW as a CL apparatus, each of the MFP 10 and the mobile terminal 110 broadcasts a participation notification including the MAC address of the apparatus to the third WFDNW. As a result, as in S226, S227, S238, S240, and S244 of FIG. 2, the CPU 62 updates the participation list and transmits the updated participation list to the MFP 10 and the mobile terminal 110. As in S227 and S244 of FIG. 2, the CPU 62 transmits the priority list to the MFP 10 and the mobile terminal 110. If the participation list and the priority list are received from the MFP 50, as in S228 of FIG. 2, the CPU 32 of the MFP 10 stores the participation list in the memory 34. Similarly, if the participation list and the priority list are received from the MFP 50, as in S246 of FIG. 2, the mobile terminal 110 stores the participation list in the memory of the mobile terminal 110. Since the priority list is stored in the memory, the MFP 50 and the mobile terminal 110 delete the received priority list without storing the received priority list in the memory.

In the case A, when the PC 120 which is the G/O apparatus of the first WFDNW is transited from a state where wireless communication cannot be executed to a state where wireless communication can be executed, the MFP 50 can configure a state where the PC 120 belongs to the third WFDNW as a G/O apparatus and the MFP 50 belongs to the third WFDNW as a CL apparatus. According to this configuration, it is possible to reduce the occurrence of a situation where the MFP 50 belongs to a wireless network as a master station. The G/O apparatus has to execute a larger number of processing, such as processing for relaying wireless communication between CL apparatuses belonging to a WFDNW and processing for periodically confirming whether each CL apparatus belongs to the WFDNW, as compared to the CL apparatus. Therefore, when the MFP 50 belongs to the WFDNW as a G/O apparatus, the MFP 50 has to execute the functions (for example, printing function and scanning function) of the MFP and also has to execute processing for the WFDNW, whereby the processing load of the MFP 50 increases. In the case A, it is possible to suppress a situation where the MFP 50 should belong to the WFDNW as a G/O apparatus. Therefore, it is possible to reduce the processing load of the MFP 50.

The MFP 50 executes the reconnection processing of S520 after executing the releasing processing in S506 and S508. According to this configuration, it is possible to avoid a situation where the MFP 50 should belong to a plurality of WFDNWs simultaneously. The MFP 50 searches for the PC 120 using the SSID in S500 and S502. According to this configuration, the MFP 50 can search for the PC 120 in the G/O state without searching for the PC 120 in the device state. As a result, the MFP 50 and the PC 120 can form a WFDNW without performing a G/O negotiation. There is a high possibility of forming the WFDNW same as the first WFDNW again.

Figure 6:
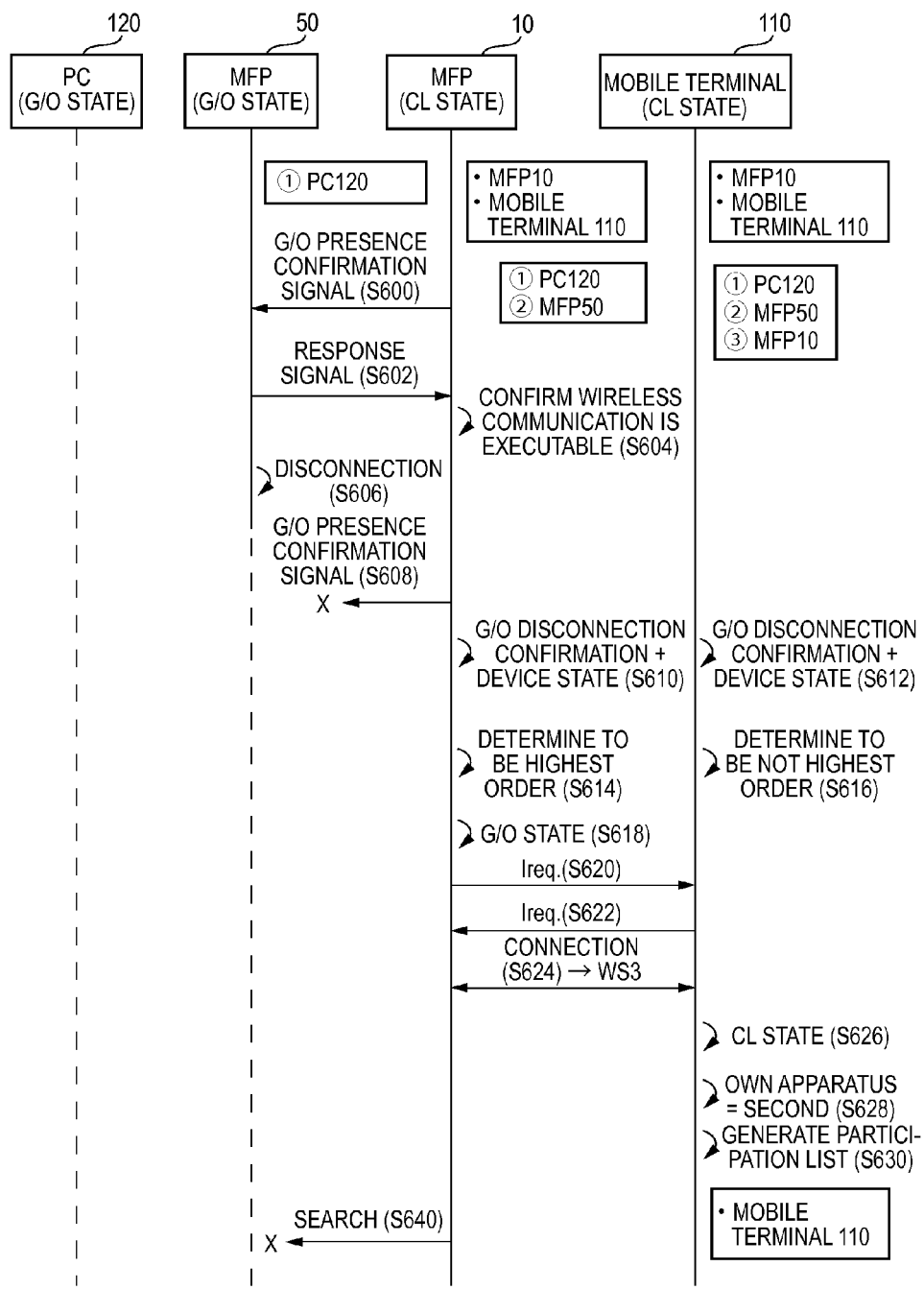
FIG. 6 is a sequence diagram of a case B where a G/O apparatus is disconnected.

(Case B where G/O Apparatus is Disconnected from Second WFDNW: FIG. 6)

An initial state of a case B of FIG. 6 is the same as the final state in FIG. 4. In S600, the MFP 10 and the mobile terminal 110, each of which is a CL apparatus, periodically execute the presence confirmation of the MFP 50 which is a G/O apparatus. In the presence confirmation method, as in S300 of FIG. 3, the BSSID included in WS2 is designated as a transmission destination, and a G/O presence confirmation signal is transmitted to the MFP 50 using the second WFDNW. In a stage of S600 where the G/O presence confirmation signal is transmitted, the MFP 50 is not disconnected from the second WFDNW. Accordingly, in S602, the CPU 62 of the MFP 50 receives the G/O presence confirmation signal from the MFP 10 and transmits a response signal including the MAC address of the MFP 50 to the MFP 10 using the second WFDNW.

For example, the MFP 50 which is a G/O apparatus is transited to a sleep state for power saving, and as a result, in S606, the MFP 50 is disconnected from the second WFDNW. Then, in S608, the CPU 32 of the MFP 10 transmits the G/O presence confirmation signal to the MFP 50 using the second WFDNW. The MFP 50 does not receive the G/O presence confirmation signal, and thus does not transmit the response signal.

Although not shown in FIG. 6, the mobile terminal 110 also transmits the G/O presence confirmation signal to the MFP 50 using the second WFDNW, but does not receive the response signal. As a result, the MFP 50 and the mobile terminal 110 confirm that wireless communication with the MFP 50 cannot be executed. In this case, in S610, since the response signal is not received from the MFP 50, the CPU 32 of the MFP 10 confirms that the MFP 50 does not belong to the second WFDNW, that is, wireless communication with the MFP 50 cannot be executed. Then, the CPU 32 causes the state of the MFP 10 to be transited from the CL state to the device state. The WFDWSI, the participation list, and the priority list in the memory 34 are maintained in the memory 34 without being deleted from the memory 34.

Similarly, in S612, the mobile terminal 110 confirms that the MFP 50 is disconnected from the second WFDNW and causes the state of the mobile terminal 110 to be transited from the CL state to the device state. Since the respective apparatuses 10 and 110 operate in the device state, wireless communication of target data cannot be executed. Therefore, the mobile terminal 110 is unable to transmit print data to the MFP 10.

In S614, if the MFP 10 is transited from the CL state to the device state, the CPU 32 determines whether the MAC address of the MFP 10 is described in the highest order of the participation list in the memory 34. That is, the CPU 32 determines whether the MFP 10 is the earliest CL apparatus of the second WFDNW. In S614, the CPU 32 determines that the MFP 10 is the earliest CL apparatus. In S616, the mobile terminal 110 confirms the participation list in the memory of the mobile terminal 110 and determines that the mobile terminal 110 is not the earliest CL apparatus of the second WFDNW. In this case, the mobile terminal 110 waits until the Ireq signal is received from the earliest CL apparatus (that is, the MFP 10) of the second WFDNW. According to this configuration, when wireless communication with the MFP 50 as a G/O apparatus cannot be executed using the second WFDNW, it is possible to appropriately determine whether the MFP 10 should belong to a new WFDNW as a G/O apparatus.

In this case, the CPU 32 executes the processing of S618 to S624. The processing of S618 to S624 is similar to the processing of S404 to S410 of FIG. 4. In S618 to S624, the CPU 32 executes the processing of the CPU 62 of S404 to S410, and the mobile terminal 110 executes the processing of the CPU 32 of S404 to S410. The processing of S626 is similar to the processing of S426 of FIG. 4. As a result, a new WFDNW (hereinafter, referred to as "fourth WFDNW") to which the MFP 10 belongs as a G/O apparatus and the mobile terminal 110 belongs as a CL apparatus is formed. In other words, a state where the MFP 10 belongs to the fourth WFDNW as a G/O apparatus and the mobile terminal 110 belongs to the fourth WFDNW as a CL apparatus is configured. As a result, WS1, WS2, and WS3 are stored in the memory 34 of the MFP 10 and the memory of the mobile terminal 110.

In S628, the mobile terminal 110 determines that the mobile terminal 110 is transited from the device state to the CL state, receives the Ireq signal in the second highest order of the participation list, and is then transited to the CL state. In S630, the mobile terminal 110 generates a new participation list in which the MAC address of the mobile terminal 110 is described in the highest order, and stores the new participation list in the memory of the mobile terminal 110, instead of an old participation list in which the MAC address of the mobile terminal 110 is described in the second highest order or a lower order.

In S640, the CPU 32 of the MFP 10 as the G/O apparatus periodically searches for the PC 120, which is the G/O apparatus of the first WFDNW, using WS1. Further, in S640, the CPU 32 periodically searches for the MFP 50, which is the G/O apparatus of the second WFDNW, using WS2. The processing of the CPU 32 in S640 is similar to the processing of the CPU 62 in S500 of FIG. 5.

Figure 7:
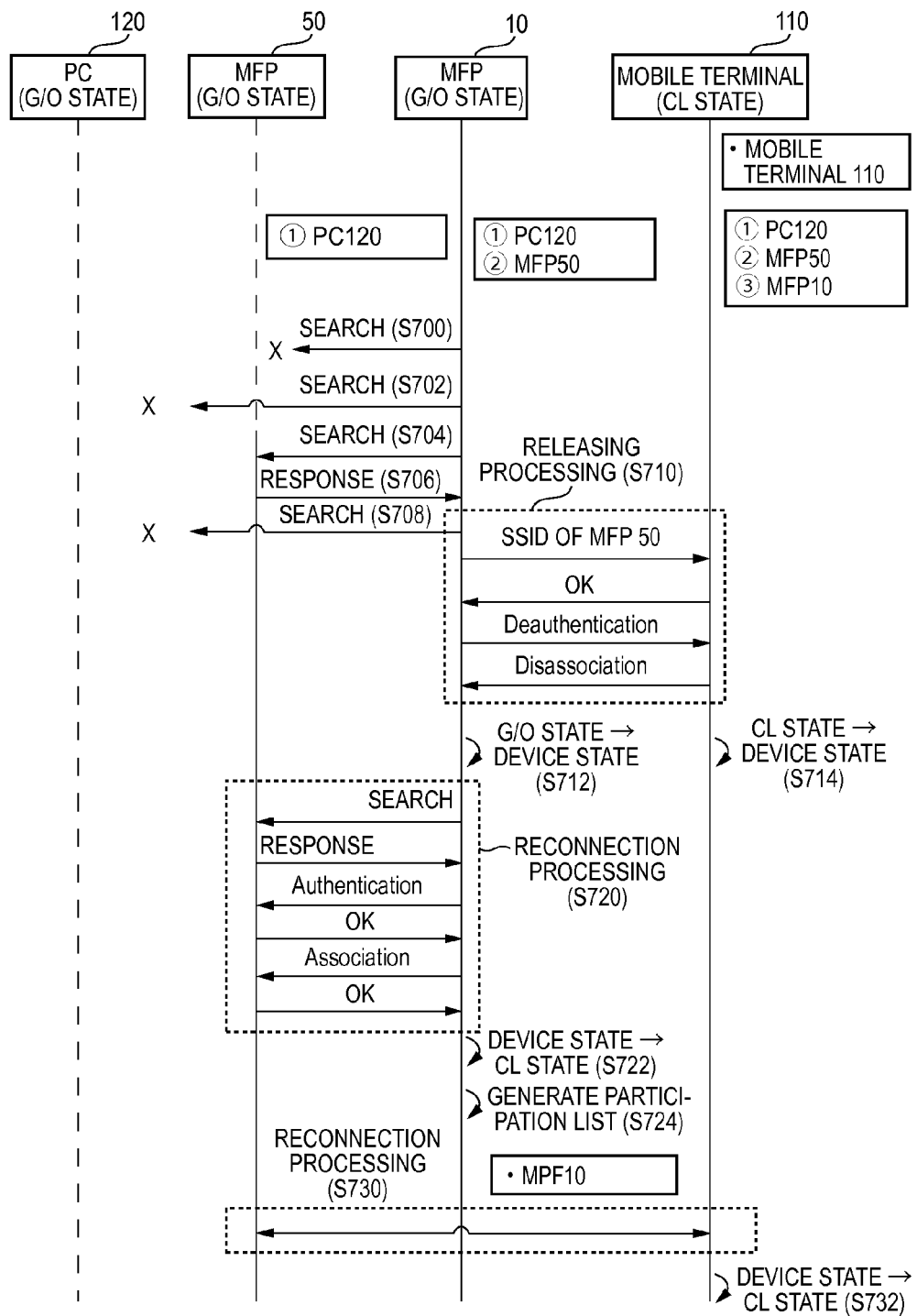
FIG. 7 is a sequence diagram of a case B-1 where an MFP as an original G/O apparatus is found.

(Case B-1 where MFP 50 Returns to Communicable State: FIG. 7)

An initial state of a case B-1 of FIG. 7 is the same as a final state of FIG. 6. In this state, the CPU 32 of the MFP 10 which is the G/O apparatus of the third WFDNW searches for the PC 120 which is the G/O apparatus of the first WFDNW (S700). Also, the CPU 32 searches for the MFP 50 which is the G/O apparatus of the second WFDNW (S702). The processing of S700 and S702 is similar to the processing of S640 of FIG. 6.

For example, there is a case where the MFP 50 is transited from a sleep state to a non-sleep state, and thus the MFP 50 and the MFP 10 are transited from a state where wireless communication cannot be executed to a state where wireless communication can be executed. The MFP 50 is maintained in the G/O state. In a state where the MFP 50 and the MFP 10 are able to execute wireless communication, the MFP 50 receives a Probe Request signal sent from the MFP 10 (S704). In S706, the MFP 50 transmits a Probe Response signal in response to the received Probe Request signal.

The CPU 32 receives the Probe Response signal from the MFP 50 to find the MFP 50. Accordingly, the CPU 32 determines that the MFP 10 and the MFP 50 are able to execute wireless communication. Then, although not shown, the CPU 32 confirms whether there is the MAC address of an apparatus having higher priority than the MAC address of the MFP 50, which should become a G/O apparatus, using the priority list in the memory 34. In the priority list, the MAC address of the PC 120 is associated with the higher order than the MAC address of the MFP 50. In this case, in S708, as in S702, the CPU 32 searches for the PC 120 after the MFP 50 is found.

Even if a predetermined period elapses after the Probe Request signal is transmitted, the CPU 32 does not receive the Probe Response signal from the PC 120. That is, the CPU 32 is unable to find the PC 120. As a result, the CPU 32 determines that the MFP 10 and the PC 120 are unable to execute wireless communication. In this case, in order to cause the MFP 10 to belong to a new WFDNW (hereinafter, referred to as "fifth WFDNW"), to which the MFP 50 belongs as a G/O apparatus, as a CL apparatus, the CPU 32 executes releasing processing of S710 with the mobile terminal 110, executes processing of S712, executes reconnection processing of S720 with the MFP 50, and executes processing of S722. The releasing processing of S710 is similar to the releasing processing of S506 of FIG. 5.

However, in S710, the CPU 32 executes the processing of the CPU 62 of S506, and the mobile terminal 110 executes the processing of the CPU 32 of S506. In S710, the CPU 32 transmits the SSID and the MAC address of the MFP 50 at the beginning of the releasing processing. Accordingly, the mobile terminal 110 can recognize that wireless communication with the MFP 50 can be executed. The processing of S712 is similar to the processing of S510 of FIG. 5, the reconnection processing of S720 is similar to the reconnection processing of S520, and the processing of S722 is similar to the processing of S522 of FIG. 5. However, in S712, S720 and S722, the CPU 32 executes the processing of the CPU 62 of S510, S520 and S522, and the CPU 62 of the MFP 50 executes the processing of the PC 120 of S520. The processing of S714 which is executed by the mobile terminal 110 is similar to the processing of S514.

Accordingly, the MFP 50 newly forms the fifth WFDNW as a G/O apparatus, and the MFP 10 participates in the fifth WFDNW as a CL apparatus. In other words, a state where the MFP 50 belongs to the fifth WFDNW as a G/O apparatus and the MFP 10 belongs to the fifth WFDNW as a CL apparatus is configured.

Since the MFP 10 finds the MFP 50 which is the original G/O apparatus and is then transited from the device state to the CL state, the MFP 10 is the earliest CL apparatus. Accordingly, in S724, the CPU 32 generates a participation list. A priority list is already stored in the memory 34, and thus, the CPU 32 does not generate a priority list.

Next, in S730, the MFP 50 and the mobile terminal 110 execute the reconnection processing similar to the reconnection processing of S720 which is executed by the MFPs 10 and 50. As a result, in S732, the mobile terminal 110 causes the state of the mobile terminal 110 to be transited from the device state to the CL state. Accordingly, a state where the MFP 50 belongs to the fifth WFDNW as a G/O apparatus and the MFP 10 and the mobile terminal 110 belong to the fifth WFDNW as CL apparatuses is configured.

In the case B-1, when the MFP 50 which is the G/O apparatus of the second WFDNW is transited from a state where wireless communication with the MFP 10 cannot be executed to a state where wireless communication can be executed, a state where the MFP 50 belongs to the fifth WFDNW as a G/O apparatus and the MFP 10 belongs to the fifth WFDNW as a CL apparatus can be configured. According to this configuration, it is possible to reduce occurrence of a situation where the MFP 10 belongs to a wireless network as a G/O apparatus. Therefore, it is possible to reduce the processing load of the MFP 10.

The MFP 10 executes the reconnection processing of S720 after the releasing processing is executed in S710. According to this configuration, it is possible to avoid a situation where the MFP 10 should belong to a plurality of WFDNWs simultaneously.

Figure 8:
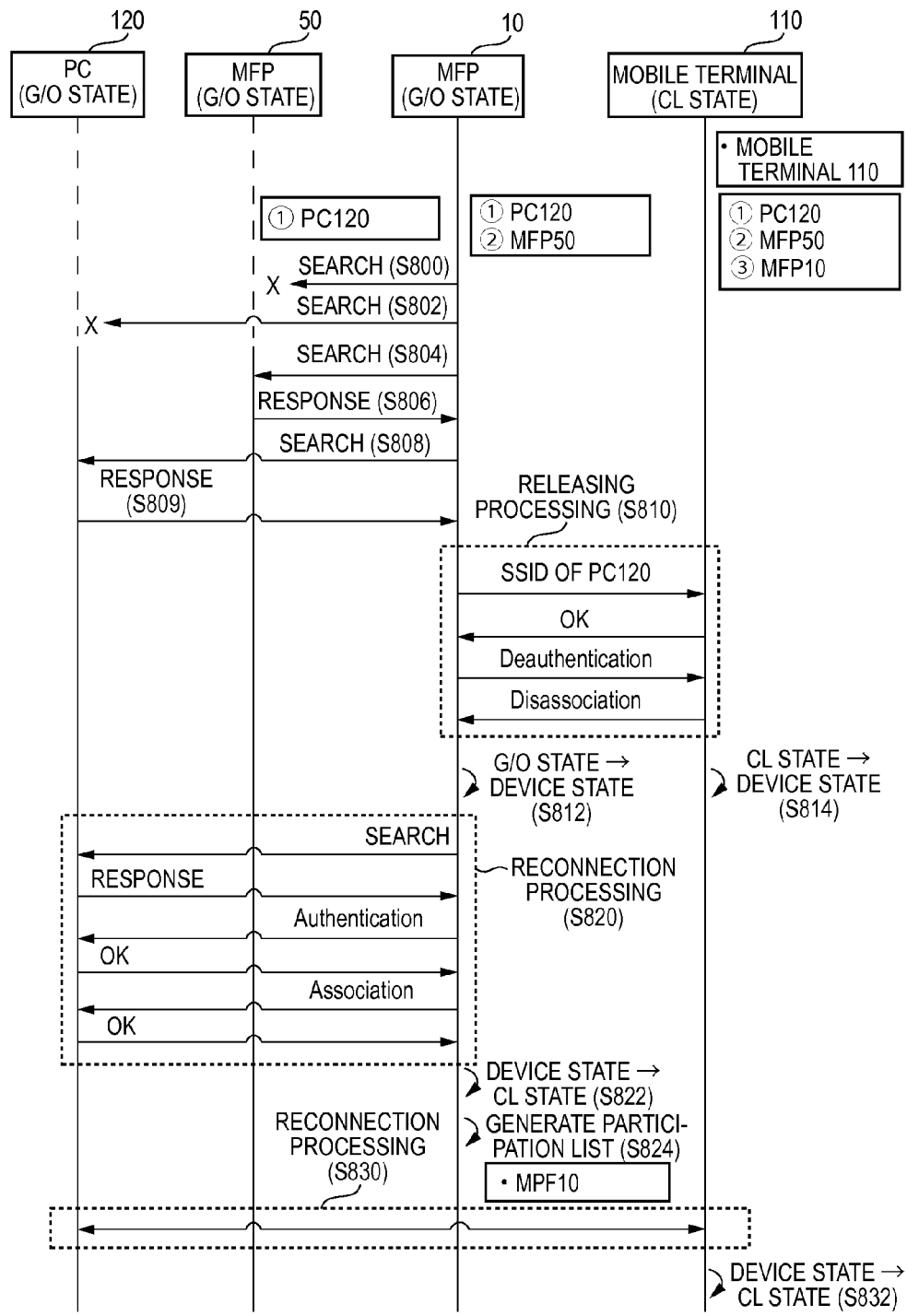
FIG. 8 is a sequence diagram of a case B-2 where a PC and an MFP as an original G/O apparatus are found.

(Case B-2 where PC 120 Returns to Communicable State: FIG. 8)

An initial state of a case B-2 of FIG. 8 is the same as the final state of FIG. 6. The processing of S800 to S808 of FIG. 8 is similar to the processing of S700 to S708 of FIG. 7.

In S808, the CPU 32 receives a Probe Response signal from the PC 120 within a predetermined period after a Probe Request signal is transmitted to the PC 120. Then, the CPU 32 finds the PC 120. As a result, the CPU 32 determines that the MFP 10 and the PC 120 are able to execute wireless communication. In this situation, since the PC 120 has higher priority as a G/O apparatus than the MFP 50, in order to cause the MFP 10 to belong to a new WFDNW (hereinafter, referred to as "sixth WFDNW"), to which the PC 120 belongs as a G/O apparatus, as a CL apparatus, the CPU 32 executes releasing processing of S810 with the mobile terminal 110 and executes processing of S812. The processing of S810 and S812 is similar to the processing of S710 and S712 of FIG. 7.

The CPU 32 executes reconnection processing of S820 with the PC 120 and executes processing of S822. After S822, the CPU 32 of the MFP 10 executes processing of S824. The reconnection processing of S820 and the processing of S822 and S824 are similar to the reconnection processing of S520 and the processing of S522 and S524 of FIG. 5. However, in S820 to S824, the CPU 32 executes the processing of the CPU 62 of S520 to S524. The PC 120 and the mobile terminal 110 execute reconnection processing of S830, and the mobile terminal 110 executes processing of S832. The processing of S810 to S832 is similar to the processing of S710 to S732. However, in S810 to S832, the mobile terminal 110 executes the processing of the CPU 32 of S710 to S732.

Accordingly, the PC 120 newly forms the sixth WFDNW as a G/O apparatus, and the MFP 10 and the mobile terminal 110 participate in the sixth WFDNW as a CL apparatus. In other words, a state where the PC 120 belongs to the sixth WFDNW as a G/O apparatus and the MFP 10 and the mobile terminal 110 belong to the sixth WFDNW as a CL apparatus is configured.

In the case B-2, as in the case B-1, when the PC 120 which is the G/O apparatus of the first WFDNW is transited from a state where wireless communication cannot be executed to a state where wireless communication can be executed, the MFP 10 can configure a state where the PC 120 belongs to the sixth WFDNW as a G/O apparatus and the MFP 10 belongs to the sixth WFDNW as a CL apparatus. According to this configuration, it is possible to reduce the occurrence of a situation where the MFP 10 belongs to a wireless network as a G/O apparatus. Therefore, it is possible to reduce the processing load of the MFP 10.

In the case B-2, when the PC 120 which is the G/O apparatus of the first WFDNW and the MFP 50 which is the G/O apparatus of the second WFDNW are transited from a state where wireless communication cannot be executed to a state where wireless communication can be executed, the MFP 10 can configure a state where the PC 120 belongs to the sixth WFDNW as a G/O apparatus and the MFP 10 and the mobile terminal 110 belong to the sixth WFDNW as CL apparatuses. Therefore, it is possible to suppress a situation where the MFP 50 should belong to the WFDNW as a G/O apparatus. Therefore, it is possible to reduce the processing load of the MFP 50.

The MFP 10 executes the reconnection processing of S820 after the releasing processing is executed in S810. According to this configuration, it is possible to avoid a situation where the MFP 10 should belong to a plurality of WFDNWs simultaneously.

According to the case B-1 and the case B-2, when an apparatus (that is, the PC 120 or the MFP 50) which previously belongs to the WFDNW, to which the MFP 10 belongs as a CL apparatus, as a G/O apparatus is found by the MFP 10, a state where an apparatus which has belonged as a G/O apparatus belongs to a new WFDNW as a G/O apparatus and the MFP 10 belongs to the new WFDNW as a CL apparatus can be configured. Therefore, it is possible to suppress a situation where the MFP 10 belongs to the WFDNW as a G/O apparatus.

Figure 9:
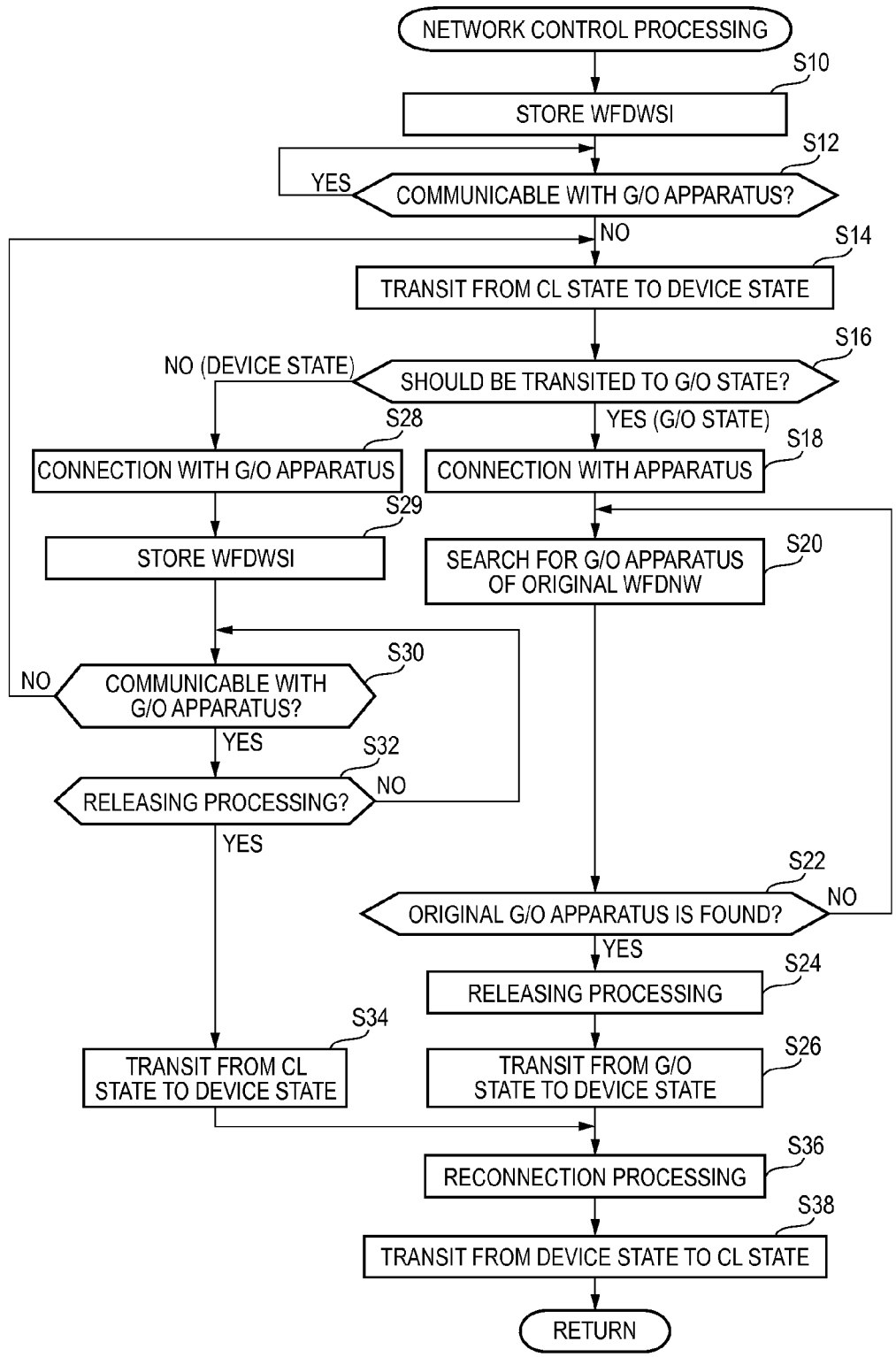
FIG. 9 is a flowchart of network control processing.

(Network Control Processing: FIG. 9)

Subsequently, network control processing which is executed by the MFP 10 will be described referring to FIG. 9. Similarly to the MFP 10, the MFP 50 and the mobile terminal 110 execute the network control processing. The network control processing starts when the MFP 10 belongs to a WFDNW as a CL apparatus. That is, an apparatus which does not belong to the WFDNW as a CL apparatus does not execute the network control processing.

In S10, the CPU 32 stores the WFDWSI transmitted from a G/O apparatus in the memory 34 (S223 of FIG. 2). Next, in S12, the CPU 32 repeatedly determines whether communication with the G/O apparatus of the WFDNW (hereinafter, referred to as "original WFDNW"), to which the MFP 10 belongs, can be executed until it is determined that communication with the G/O apparatus of the original WFDNW cannot be executed (S300 and S304 of FIG. 3). When it is determined that communication with the G/O apparatus cannot be executed (NO in S12), in S14, the CPU 32 causes the MFP 10 to be transited from the CL state to the device state (S316 of FIG. 3, S610 of FIG. 6). Next, in S16, the CPU 32 determines whether the MFP 10 should be transited to the G/O state (S402 of FIG. 4, S614 of FIG. 6). Specifically, when the MAC address of the MFP 10 is described in the highest order of the participation list stored in the memory 34, the CPU 32 determines that the MFP 10 should be transited to the G/O state (S614 of FIG. 6) (YES in S16). When the MAC address of the MFP 10 is described in an order other than the highest order of the participation list, it is determined that the MFP 10 should not be transited to the G/O state (S402 of FIG. 4) (NO in S16).

When it is determined to be YES in S16, the CPU 32 causes the MFP 10 to be transited from the device state to the G/O state (S618 of FIG. 6) and proceeds to S18. In S18, the CPU 32 establishes a connection with an apparatus (that is, an apparatus which belongs to the original WFDNW as a CL apparatus) having a MAC address described in the participation list (S624 of FIG. 6). Next, in S20, the G/O apparatus (hereinafter, referred to as "original G/O apparatus") of the original WFDNW is searched for (S640 of FIG. 6, S700, S704, and S708 of FIG. 7, S800, S804, and S808 of FIG. 8).

In S22, the CPU 32 determines whether the original G/O apparatus is found as a result of the search of S18. Specifically, as in S706 of FIGS. 7, S806 and S809 of FIG. 8, when a response to the Probe Request signal transmitted in S18 is received, it is determined that the original G/O apparatus is found (YES in S22), and when a response to the Probe Request signal is not received, it is determined that the original G/O apparatus is not found (NO in S22).

When it is determined to be NO in S22, the process returns to S20. When it is determined to be YES in S22, in S24, the releasing processing (S710 of FIG. 7, S810 of FIG. 8) is executed. Next, in S26, the CPU 32 causes the MFP 10 to be transited from the G/O state to the device state (S712 of FIG. 7, S812 of FIG. 8) and proceeds to S36.

When it is determined to be NO in S16 (that is, when it is determined that the MFP 10 should not be transited to the G/O state), in S28, the CPU 32 establishes a connection with an apparatus (for example, the MFP 50) (hereinafter, referred to as "new a G/O apparatus") which is the CL apparatus belonging to the original WFDNW and is transited to the G/O state (S410 of FIG. 4). Next, in S29, the CPU 32 stores the WFD-WSI transmitted from the G/O apparatus in the memory 34 (S411 of FIG. 4). Then, in S30, as in S12, the CPU 32 determines whether communication with the new a G/O apparatus can be executed. When communication with the new a G/O apparatus cannot be executed (NO in S30), the process proceeds to S14.

When communication with the new a G/O apparatus can be executed (YES in S30), in S32, the CPU 32 determines whether the new G/O apparatus executes the releasing processing (S506 of FIG. 5). Specifically, when the SSID of the original G/O apparatus is received from the new G/O apparatus, the CPU 32 determines that the new G/O apparatus executes the releasing processing (S506 of FIG. 5). According to this configuration, the CPU 32 receives the SSID of the original G/O apparatus, thereby recognizing that the original G/O apparatus can perform wireless communication. When the new G/O apparatus executes the releasing processing (YES in S32), the CPU 32 proceeds to S34, and when the new G/O apparatus does not execute the releasing processing (NO in S32), the CPU 32 returns to S30.

In S34, the CPU 32 causes the MFP 10 to be transited from the CL state to the device state (S512 of FIG. 5) and proceeds to S36. In S36, the CPU 32 executes the reconnection processing (S530 of FIG. 5, S720 of FIG. 7, S820 of FIG. 8) for connection with the original G/O apparatus. In S20, when a plurality original G/O apparatuses are found (for example, the PC 120 and the MFP 50), the CPU 32 executes reconnection processing with original G/O apparatus (for example, the PC 120) described in a higher order in the priority list stored in the memory 34 among the plurality of original G/O apparatuses. Next, in S38, the CPU 32 causes the MFP 10 to be transited from the device state to the CL state (S532 of FIG. 5, S722 of FIG. 7, S822 of FIG. 8) and returns to S10.

(List Management Processing: FIG. 10)

Subsequently, list management processing which is executed by the MFP 10 will be described referring to FIG. 10. Similarly to the MFP 10, the MFP 50 and the mobile terminal 110 execute the list management processing. The list management processing is processing which is executed by a CL apparatus. That is, a G/O apparatus and a device apparatus do not execute the list management processing.

In S40, the CPU 32 determines whether the state of the MFP 10 is transited from the device state to the CL state. As described above, the list management processing is processing which is executed by a CL apparatus and is not executed by device apparatus. Accordingly, the MFP 10 is transited from the device state to the CL state, and as a result, when S40 is executed first after the list management processing starts, the CPU 32 determines S40 to be YES and proceeds to S42.

In S42, the CPU 32 determines whether the MFP 10 is transited to the CL state after executing a G/O negotiation. When the MFP 10 is transited to the CL state after executing the G/O negotiation in S40 (for example, when the MFP 50 is transited to the CL state in S208 of FIG. 2), the CPU 32 determines S42 to be YES and proceeds to S44. Since a WFDNW is newly formed as a result of the G/O negotiation after the MFP 10 executes the G/O negotiation and belongs to the WFDNW as a CL apparatus (that is, it is determined to be YES in S42), this means that the first CL apparatus which belongs to the WFDNW is the MFP 10.

Further, in S42, the CPU 32 determines whether the MFP 10 is transited to the CL state in S10 after receiving the Ireq signal in a state where the WFD MAC address of the MFP 10 is described in the second highest order of the participation list in the memory 34 (hereinafter, referred to as "state where the MFP 10 is in the second highest order") (S414 of FIG. 4). When the MFP 10 is transited to the CL state after receiving the Ireq signal in the second highest order (for example, a case of transition of S412 of FIG. 4), the CPU 32 determines S42 to be YES and proceeds to S44.

That is, as shown in FIG. 4, when the MFP 10 is transited to the device state from a state of belonging to the first WFDNW as a CL apparatus and belongs to the second WFDNW as a CL apparatus, S40 is determined to be YES and the determination of S42 is executed. The participation list subjected to the determination of S42 is the participation list (for example, the participation list updated in S242 of FIG. 2) which is stored in the memory 34 when the MFP 10 belongs to the first WFDNW and is maintained in the memory 34 without being deleted even if the MFP 10 is transited to the device state.

Further, in S42, the CPU 32 determines whether an original G/O apparatus is found and reconnection processing is executed to cause transition to the CL state in S40. When the original G/O apparatus is found and the transition to the CL state is made by the reconnection processing (for example, a case of transition of S722 of FIG. 7, S822 of FIG. 8), the CPU 32 determines S42 to be YES and proceeds to S44.

As described above, when S42 is determined to be YES, this means that the first CL apparatus (the earliest CL apparatus) which belongs to the WFDNW is the MFP 10. In this situation, in S44, the CPU 32 generates a new participation list in which the MAC address of the MFP 10 is described and stores the new participation list in the memory 34. At the time of S44, the new participation list includes only the MAC address of the MFP 10. That is, the MAC address of the MFP 10 is described in the highest order of the participation list. When S44 starts and when an old participation list is stored in the memory 34, the control unit 30 deletes the old participation list from the memory 34 and stores the new participation list in the memory 34.

In S44, when a priority list is not stored in the memory 34, the CPU 32 generates a priority list in which the MAC address of a G/O apparatus is described and stores the priority list in the memory 34. In S44, when a priority list is stored in the memory 34, the CPU 32 does not generate a new priority list. If S44 ends, the process returns to S40.

When the MFP 10 is transited to the CL state without executing the G/O negotiation and without receiving the Ireq signal, the CPU 32 determines S42 to be NO and proceeds to S46. A situation where S42 is determined to be NO includes a situation where the MFP 10 is transited to the CL state in S224 of FIG. 2 and S532 of FIG. 5.

In either situation described above, when the MFP 10 in the device state newly participates in a WFDNW, a CL apparatus already belongs to the WFDNW. Accordingly, the MFP 10 is not the earliest CL apparatus which first participates in the WFDNW, and the participation list has been generated already.

In S46, the CPU 32 broadcasts the participation notification to the WFDNW (S225 of FIG. 2). In S48, the CPU 32 receives the participation list and the priority list transmitted from the earliest CL apparatus (S227 of FIG. 2). As described above, in the received participation list, the MAC address of the MFP 10 is described in the lowest order. In S48, the CPU 32 stores the received participation list and priority list in the memory 34. When an old participation list is stored in the memory 34, the CPU 32 deletes the old participation list from the memory 34 and stores the received participation list in the memory 34. When the priority list is already stored in the memory 34, the CPU 32 does not store the received priority list in the memory 34.

Next, in S49, when the priority list is received in the memory 34 in S48, the CPU 32 updates the received priority list using the received participation list (S228 of FIG. 2) and returns to S40. When the priority list is already stored in the memory 34 before the priority list is received in S48, the CPU 32 skips S49 and returns to S40.

In S50, the CPU 32 monitors the reception of a participation notification. If a participation notification is received from new CL apparatus through a G/O apparatus (S236 of FIG. 2, S428 of FIG. 4), the CPU 32 determines S50 to be YES and proceeds to S52.

In S52, the CPU 32 determines whether the MAC address of the MFP 10 is described in the highest order of the participation list in the memory 34. That is, the CPU 32 determines whether the MFP 10 is the earliest CL apparatus. When the MFP 10 is the earliest CL apparatus, the CPU 32 determines S52 to be YES and proceeds to S54. When the MFP 10 is not the earliest CL apparatus (when the participation notification is received in S236 of FIG. 2), the CPU 32 determines S52 to be NO, skips S54 and S56, and returns to S40.

In S54, the CPU 32 describes the MAC address (that is, the MAC address of the new CL apparatus) included in the participation notification in the lowest order of the participation list and generates an updated participation list (S430 of FIG. 4). Accordingly, the updated participation list is stored in the memory 34.

Next, in S56, the CPU 32 transmits the updated participation list to other CL apparatuses (for example, the mobile terminal 110) belonging to the WFDNW (S432 of FIG. 4). If S56 ends, the process returns to S40.

In S60, the CPU 32 monitors the reception of the participation list. In S56 described above or S78 described below, the earliest CL apparatus different from the MFP 10 can transmit a participation list to the CL apparatus of the WFDNW. In this case, the CPU 32 receives the participation list from the earliest CL apparatus through the G/O apparatus (S240 of FIG. 2), and as a result, the CPU 32 determines S60 to be YES and proceeds to S62.

In S62, the CPU 32 deletes an old participation list from the memory 34 and stores the received participation list in the memory 34 (S242 of FIG. 2). Accordingly, the CPU 32 can update the participation list. If S62 ends, the process returns to S40.

In S70, the CPU 32 determines whether the MAC address of the MFP 10 is described in the highest order of the participation list in the memory 34. That is, the CPU 32 determines whether the MFP 10 is the earliest CL apparatus. When the MFP 10 is the earliest CL apparatus, the CPU 32 determines S70 to be YES and proceeds to S72.

In S72, the CPU 32 executes the presence confirmation for each CL apparatus different from the MFP 10, which is the earliest CL apparatus. In S74, the CPU 32 determines whether there is a disconnected apparatus. When there is a disconnected apparatus, the control unit 30 determines S74 to be YES and proceeds to S76. When there is no disconnected apparatus, the CPU 32 determines S74 to be NO, skips S76 and S78, and returns to S10.

In S76, the CPU 32 deletes the MAC address of the disconnected apparatus from the participation list in the memory 34 and generates an updated participation list.

Next, in S78, the CPU 32 broadcasts the updated participation list to the WFDNW. The participation list is transmitted to each CL apparatus (that is, each CL apparatus which is different from the MFP 10 and other than the disconnected apparatus) belonging to the WFDNW through the G/O apparatus. As a result, each CL apparatus updates the participation list (S62).

The CPU 32 executes S72 to S78 each time S70 is determined to be YES. That is, the CPU 32 repeatedly executes the presence confirmation of a CL apparatus. For example, in a situation where an interval for executing the determination of S70 is substantially constant, the CPU 32 executes the presence confirmation of a CL apparatus periodically. If S78 ends, the process returns to S70.

As described above, in S70 to S78, the MFP 10 which is the earliest CL apparatus executes the presence confirmation of a CL apparatus. In other words, when the earliest CL apparatus is another CL apparatus different from the MFP 10, another CL apparatus executes the presence confirmation. However, there is a possibility that another CL apparatus is disconnected from the WFDNW. In this case, there is no CL apparatus which executes the presence confirmation, and as a result, the participation list is not updated. In order to suppress the occurrence of this situation, the CPU 32 executes S80 and S82 described below.

In S80, the CPU 32 determines whether the MFP 10 is in the second highest order (that is, a state where the WFD MAC address of the MFP 10 is described in the second highest order of the participation list). When the MFP 10 is in the second highest order, the CPU 32 determines S80 to be YES and proceeds to S82. When the MFP 10 is not in the second highest order, the CPU 32 determines S80 to be NO, skips S82, and returns to S40.

In S82, the CPU 32 determines whether a state where a CL presence confirmation signal is not received is continued for a predetermined time. When the earliest CL apparatus is disconnected from the WFDNW, the CL presence confirmation signal is not transmitted from the earliest CL apparatus. In this case, since the CL presence confirmation signal is not received during the above-described predetermined time, the CPU 32 determines S82 to be YES and executes S72 to S78.

That is, the CPU 32 transmits the CL presence confirmation signal instead of the earliest CL apparatus (S72), and as a result, it is determined that the earliest CL apparatus is disconnected from the WFDNW (YES in S74). Then, the CPU 32 deletes the MAC address of the earliest CL apparatus from the participation list in the memory 34 and generates an updated participation list (S76). As a result, in the updated participation list, the WFD MAC address of the MFP 10 is described in the highest order. That is, the MFP 10 becomes the earliest CL apparatus. Next, the CPU 32 broadcasts the updated participation list to the WFDNW (S78).

Similarly to the MFP 10, the MFP 50 and the mobile terminal 110 execute the list management processing of FIG. 10. For example, when the MFP 50 executes the list management processing, the CPU 62 of the MFP 50 executes processing in FIG. 10, instead of the CPU 32. Since the respective apparatuses 10, 50 and 110 execute the list management processing, when each apparatus 10 or the like is a CL apparatus, each apparatus 10 or the like can have a participation list in which the MAC address of each apparatus 10 or the like is described.

(Correspondence)

The MFP 10, the PC 120, the mobile terminal 110 and the MFP 50 are examples of "communication apparatus", "first device", "second device" and "third device", respectively. The memory 34 is an example of "memory", and the "memory" may be provided separately from the "communication apparatus". The first WFDNW, the second WFDNW and the fourth WFDNW are examples of "first wireless network", "fourth wireless network" and "second wireless network", respectively. In the case B-1 of FIG. 7, the fifth WFDNW is an example of "fifth wireless network", and the MFP 50 is an example of "target device". In the case B-2 of FIG. 8, the sixth WFDNW is an example of "third wireless network" and "fifth wireless network", and the PC 120 is an example of "target device".

The WS1 and the WS2 are examples of "first communication information" and "second communication information", respectively, and the MAC address of the mobile terminal 110 is an example of "identification information of second device".

The processing of S10 of FIG. 9 is an example of "storing processing of first communication information", and the processing of S29 is an example of "storing processing the second communication information". The processing of S12 and S30 of FIG. 9 is an example of "confirming processing", the processing of S18 and S36 is an example of "configuring processing", the processing of S20 is an example of "searching processing", the processing of S24 is an example of "disconnecting processing" and "notifying processing", the processing of S28 is an example of "establishing processing", and the processing of S16 is an example of "determining processing". The processing of S48 of FIG. 10 is an example of "storing processing of the identification information of the second device".

While the present invention has been shown and described with reference to certain illustrative embodiments thereof, it will be understood by those skilled in the art that various changes in form and details may be made therein without departing from the spirit and scope of the invention as defined by the appended claims.

(1) For example, in the case A of FIG. 5, when an operation to power off the PC 120 is executed, the PC 120 (that is, a G/O apparatus) may transmit a disconnection signal indicating that the PC 120 is disconnected from the first WFDNW to the respective CL apparatuses 10, 50 and 110. That is, the G/O apparatus of the WFDNW may transmit the disconnection signal to the respective CL apparatuses when disconnected from the WFDNW. In this case, when the disconnection signal is received from the PC 120, the respective CL apparatuses 10, 50 and 110 may be transited to the device state. That is, even if the G/O presence confirmation signal (see FIG. 4) is not transmitted, the respective apparatuses 10, 50 and 110 can recognize that the PC 120 is disconnected from the first WFDNW. In this modified illustrative embodiment, a case where the disconnection signal is received is an example of a case where it is confirmed that wireless communication with a first device cannot be executed using a first wireless network.

(2) For example, in the case B-1 of FIG. 7, the MFP 50 may send a communication permission signal indicating that the MFP 50 can perform wireless communication. The communication permission signal may include the MAC address of the MFP 50. The CPU 32 of the MFP 10 may monitor the reception of the communication permission signal. Then, the CPU 32 may receive the communication permission signal to find the MFP 50. That is, the CPU 32 may not send the Probe Request signal to search for the MFP 50. In this modified illustrative embodiment, processing for monitoring the reception of the communication permission signal is an example of "searching processing".

(3) In the case B-1 of FIG. 7, the CPU 32 of the MFP 10 may execute the releasing processing of the third WFDNW after the reconnection processing with the MFP 50 is executed, that is, after the fourth WFDNW is formed. In this case, the MFP 10 may include mechanism for belonging to a plurality of WFDs, for example, a plurality of wireless LAN I/Fs.

(4) In the above-described illustrative embodiment, an example where print data is transmitted from the mobile terminal 110 to the MFP 10 has been described. However, the technique of the above-described illustrative embodiment may be applied to communication of data different from print data. For example, scan data may be transmitted from the MFP 10 to the mobile terminal 110. The technique of the above-described illustrative embodiment may be applied to communication of data (for example, sound data, motion image data, or the like) of types different from print data and scan data.

(5) A method in which the CL apparatus (for example, the MFP 10) acquires the MAC address of another CL apparatus (for example, the mobile terminal 110) is not limited to a method which executes the list management processing of FIG. 10. For example, when the WFDNW to which the mobile terminal 110 and the MFPs 10 and 50 belong as CL apparatuses is formed, the CPU 32 of the MFP 10 may broadcast a request packet of a MAC address to the WFDNW at a predetermined timing (for example, periodically). In this case, when the request packet is received, the mobile terminal 110 transmits a response packet including the MAC address of the mobile terminal 110 to the MFP 10. Then, the CPU 32 can receive the MAC address from the mobile terminal 110 through the G/O apparatus. Similarly, the CPU 32 can receive the MAC address from the MFP 50. The CPU 62 of the MFP 50 may broadcast the request packet of the MAC address to the WFDNW at a predetermined timing (for example, periodically). In this case, the CPU 62 of the MFP 50 can receive the MAC address from each CL apparatus 10 and 50 through the G/O apparatus.

(6) A "master station" is not limited to the G/O apparatus of the WFD, and any apparatus may be used as long as the apparatus manages each apparatus belonging to the wireless network (for example, an apparatus can relay wireless communication among the respective apparatuses belonging to the wireless network). A "slave station" is not limited to the CL apparatus of the WFD, and any apparatus may be used as long as the apparatus is managed from the master station of the wireless network. Each apparatus may be connected to a wireless LAN (for example, a normal Wi-Fi (Registered Trademark) communication network) which performs communication through an AP. In this case, the AP may be an example of "first device", and the normal Wi-Fi communication network may be an example of "first wireless network". In this case, in a situation where communication with the AP cannot be executed, when a WFDNW in which the MFP 50 is a G/O apparatus is temporarily formed and communication with the AP can be executed, a normal Wi-Fi communication network may be newly formed.

(7) A "communication apparatus" and "first device" to "third device" are not limited to the MFPs 10 and 50, the mobile terminal 110, and the PC 120, and other communication apparatuses (for example, a printer, a scanner, a FAX machine, a copying machine, a telephone, a desktop PC, a server and the like) may be used.

(8) In the above-described illustrative embodiment, the CPU 32 of the MFP 10 executes the program (that is, software) in the memory 34, whereby each processing of S10 to S82 of FIGS. 9 and 10 is realized. Alternatively, at least one of the respective processing of S10 to S82 of FIGS. 9 and 10 may be realized by hardware, such as a logic circuit.

(9) Further, for example, in the case B-1 of FIG. 7, when the MFP 50 is found, the CPU 32 of the MFP 10 may transmit information indicating the finding of the MFP 50 to the mobile terminal 110 which is a CL apparatus, using the fourth WFDNW. Then, the CPU 32 may execute the releasing processing of S710. That is, the CPU 32 may transmit information indicating the finding of the MFP 50 to the mobile terminal 110 separately from the releasing processing. In this modified illustrative embodiment, the processing for transmitting information indicating the finding of the MFP 50 is an example of "notifying processing".

The technical elements described in this specification or the drawings exhibit technical utility singly or in various combinations and are not limited to the combinations described in the appended claims as filed. The techniques illustrated in this specification or the drawings simultaneously attain a plurality of purposes, and attaining one of the purposes per se offers technical utility.

What is claimed is:

1. A communication apparatus comprising:
a controller configured to:
   in a first belonging state where a first device belongs to a first wireless network as a master station and the communication apparatus belongs to the first wireless network as a slave station, store first communication information for executing wireless communication with the first device, in a memory;
   in the first belonging state where one or more devices including a second device belongs to the first wireless network as a slave station, store identification information of the second device, in the memory;
   confirm whether wireless communication with the first device can be executed using the first wireless network;
   when it is confirmed that wireless communication with the first device cannot be executed using the first wireless network, configure a second belonging state where the communication apparatus and the second device belong to a second wireless network, and where the communication apparatus belongs to the second wireless network as a master station and the second device belongs to the second wireless network as a slave station;
   search for the first device using the first communication information stored in the memory;
   when the first device is found by the search, cause the communication apparatus to be disconnected from the second wireless network; and
   when the communication apparatus is disconnected from the second wireless network, configure a third belonging state where the communication apparatus and the first device belong to a third wireless network, and where the communication apparatus belongs to the third wireless network as a slave station and the first device belongs to the third wireless network as a master station.

2. The communication apparatus according to claim 1, wherein the controller is configured to configure the third belonging state after the communication apparatus is disconnected from the second wireless network.

3. The communication apparatus according to claim 1, wherein the controller is configured to:
when the first device is found by the search, notify the second device using the second wireless network that the first device is found.

4. The communication apparatus according to claim 1, wherein the controller is configured to:
while it is confirmed that wireless communication with the first device cannot be executed using the first wireless network in a fourth belonging state where the second device and a third device among the one or more devices belonging to the first wireless network as a slave station belong to a fourth wireless network, and where the third device belongs to the fourth wireless network as a master station and the second device belongs to the fourth wireless network as a slave station, establish a wireless connection with the third device such that the communication apparatus belongs to the fourth wireless network as a slave station;
in a state where the communication apparatus belongs to the fourth wireless network as a slave station, store second communication information for executing wireless communication with the third device, in the memory;
confirm whether wireless communication with the third device can be executed using the fourth wireless network;
when it is confirmed that the wireless communication with the first device cannot be executed using the first wireless network and when it is confirmed that wireless communication cannot be executed with the third device using the fourth wireless network, configure the second belonging state;
search for the third device using the second communication information stored in the memory;
when a target device which is one of the first device and the third device is found by the search, cause the communication apparatus to be disconnected from the second wireless network; and
when the communication apparatus is disconnected from the second wireless network, configure a fifth belonging state where the communication apparatus and the target device belong to a fifth wireless network, and where the communication apparatus belongs to the fifth wireless network as a slave station and the target device belongs to the fifth wireless network as a master station.

5. The communication apparatus according to claim 1, wherein the controller is configured to:
when it is confirmed that wireless communication with the first device cannot be executed using the first wireless network, determine whether a state where the communication apparatus among one or more slave stations belonging to the first wireless network belongs to a wireless network as a master station should be configured; and
when it is determined that the state where the communication apparatus belongs to a wireless network as a master station should be configured, configure the second belonging state.

6. The communication apparatus according to claim 1, wherein the first communication information includes a Service Set Identifier (SSID).

7. A non-transitory computer-readable medium having a computer program stored thereon and readable by a processor of a communication apparatus, the computer program, when executed by the processor, causing the communication apparatus to perform processing comprising:
in a first belonging state where a first device belongs to a first wireless network as a master station and the communication apparatus belongs to the first wireless network as a slave station, storing first communication information for executing wireless communication with the first device, in a memory;
in the first belonging state where one or more devices including a second device belongs to the first wireless network as a slave station, storing identification information of the second device, in the memory;
confirming whether wireless communication with the first device can be executed using the first wireless network;
when it is confirmed that wireless communication with the first device cannot be executed using the first wireless network, configuring a second belonging state where the communication apparatus and the second device belong to a second wireless network, and where the communication apparatus belongs to the second wireless network as a master station and the second device belongs to the second wireless network as a slave station;
searching for the first device using the first communication information stored in the memory;
when the first device is found by the search, causing the communication apparatus to be disconnected from the second wireless network; and
when the communication apparatus is disconnected from the second wireless network, configuring a third belonging state where the communication apparatus and the first device belong to a third wireless network, and where the communication apparatus belongs to the third wireless network as a slave station and the first device belongs to the third wireless network as a master station.

* * * * *